(12) United States Patent
Bonam et al.

(10) Patent No.: US 11,449,420 B2
(45) Date of Patent: Sep. 20, 2022

(54) CONTENT CACHING

(71) Applicant: Citrix Systems, Inc., Fort Lauderdale, FL (US)

(72) Inventors: Tirupati Reddy Bonam, Santa Clara, CA (US); Sasmita Patra, Santa Clara, CA (US); Navaneetha Subramanian, Santa Clara, CA (US); Abhishek Gupta, Santa Clara, CA (US); Srinivasa Rao Sanchula, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 55 days.

(21) Appl. No.: 17/075,228

(22) Filed: Oct. 20, 2020

(65) Prior Publication Data
US 2022/0121569 A1 Apr. 21, 2022

(51) Int. Cl.
*G06F 12/00* (2006.01)
*G06F 12/06* (2006.01)
*G06F 12/0802* (2016.01)
*G06F 8/71* (2018.01)

(52) U.S. Cl.
CPC ............ *G06F 12/0802* (2013.01); *G06F 8/71* (2013.01); *G06F 2212/60* (2013.01)

(58) Field of Classification Search
CPC ..... G06F 12/0802; G06F 8/71; G06F 2212/60
See application file for complete search history.

(56) References Cited

U.S. PATENT DOCUMENTS 6,195,680 B1 * 2/2001 Goldszmidt ........ H04L 47/2416
709/203
7,203,741 B2 * 4/2007 Marco ..................... G06F 9/465
709/223
(Continued)

FOREIGN PATENT DOCUMENTS

WO 2018151771 A1 8/2018

OTHER PUBLICATIONS microsoft.com, "BranchCache", https://docs.microsoft.com/en-us/windows-server/networkinng/branchcache/branchcache#BKMK_8, Aug. 7, 2020, pp. 1-23.
(Continued)

*Primary Examiner* — Shawn X Gu
*Assistant Examiner* — Mohammad S Hasan
(74) *Attorney, Agent, or Firm* — Pierce Atwood LLP

(57) ABSTRACT

A method may include receiving, by a first computing system, a first request from a first client device to download content. The method may further include receiving, by the first computing system from a second computing system, first information. The first information may be indicative of a first version of the content that the first client device is authorized to download and a source from which the first version of the content can be downloaded. The method may also include determining, by the first computing system and based at least in part on the first information, that the first version of the content is already present on the first computing system. The method may additionally include sending, from the first computing system to the first client device, the first version of the content or second information, the second information indicative of the first version of the content.

20 Claims, 12 Drawing Sheets

(56) References Cited

U.S. PATENT DOCUMENTS

| | | | | |
|---|---|---|---|---|
| 7,299,291 B1* | 11/2007 | Shaw | ................... | H04L 67/1038 |
| | | | | 709/227 |
| 9,069,792 B1 | 6/2015 | Craighead | | |
| 11,057,446 B2* | 7/2021 | Shribman | ........... | H04N 21/6125 |
| 2005/0262573 A1* | 11/2005 | Bo | ...................... | H04N 21/6334 |
| | | | | 348/E7.071 |
| 2013/0013859 A1* | 1/2013 | Zhu | ..................... | G06F 16/9574 |
| | | | | 711/E12.017 |
| 2015/0067819 A1* | 3/2015 | Shribman | ............... | H04L 67/06 |
| | | | | 709/218 |
| 2016/0066004 A1* | 3/2016 | Lieu | ................. | H04N 21/42684 |
| | | | | 725/29 |
| 2017/0124170 A1 | 5/2017 | Koorapati et al. | | |
| 2020/0220746 A1* | 7/2020 | Shribman | ................. | G06F 8/71 |

OTHER PUBLICATIONS

European Search Report dated Mar. 18, 2022 for European Patent Application No. 21201322.1.

* cited by examiner

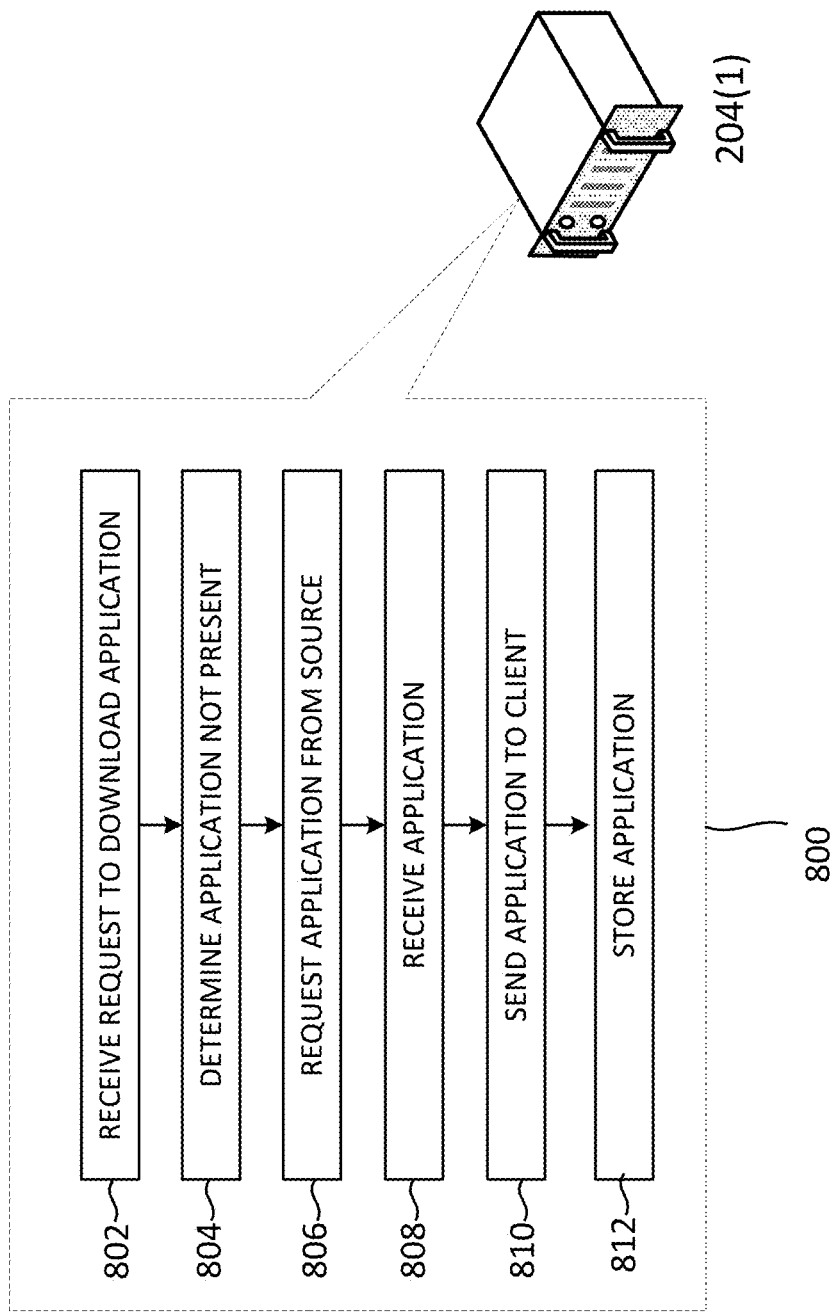

CONTENT CACHING

BACKGROUND

Content such as software applications may be available from or be served from a content source such as a Content Delivery Network (CDN). CDNs may include servers and data centers and may be spaced geographically to improve content availability for end users. Content publishers may employ CDNs to deliver or serve their content to end users or endpoint devices. This may allow CDNs to help relieve high traffic and related problems on the Internet. CDNs may also help improve bandwidth availability in wide area networks (WANs).

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method may include receiving, by a first computing system, a first request from a first client device to download content. The method may further include receiving, by the first computing system from a second computing system, first information. The first information may be indicative of a first version of the content that the first client device is authorized to download and a source from which the first version of the content can be downloaded. The method may also include determining, by the first computing system and based at least in part on the first information, that the first version of the content is already present on the first computing system. The method may additionally include sending, from the first computing system to the first client device, the first version of the content or second information, the second information indicative of the first version of the content.

In some disclosed embodiments, a first system may include at least one processor, and at least one computer-readable medium encoded with instructions which, when executed by the at least one processor, cause the first system receive a first request from a first client device to download content. The instructions may also cause the first system to receive from a second system, first information. The first information may be indicative of a first version of the content that the first client device is authorized to download and a source from which the first version of the content can be downloaded. The instructions may further cause the first system to determine, based at least in part on the first information, that the first version of the content is already present on the first system. The instructions may additionally cause the first system to send, to the first client device, the first version of the content or second information, the second information indicative of the first version of the content.

In some disclosed embodiments, a method may include receiving, by a computing system, a request from a first client device to download an application. The method may also include determining, by the computing system, that the application is not already present on the computing system. The method may further include requesting, based at least in part on the application not being present on the computing system, the application from an external content source. The method may additionally include receiving, by the computing system, the application from the external content source. Moreover, the method may include sending, by the computing system, the application to the first client device. Furthermore, the method may include storing, by the computing system, the application so that the application is subsequently available to be downloaded from the computing system by another client device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 8 also shows an example content caching process involving example operations in accordance various aspects of the disclosure;

DETAILED DESCRIPTION

Figure 1A:
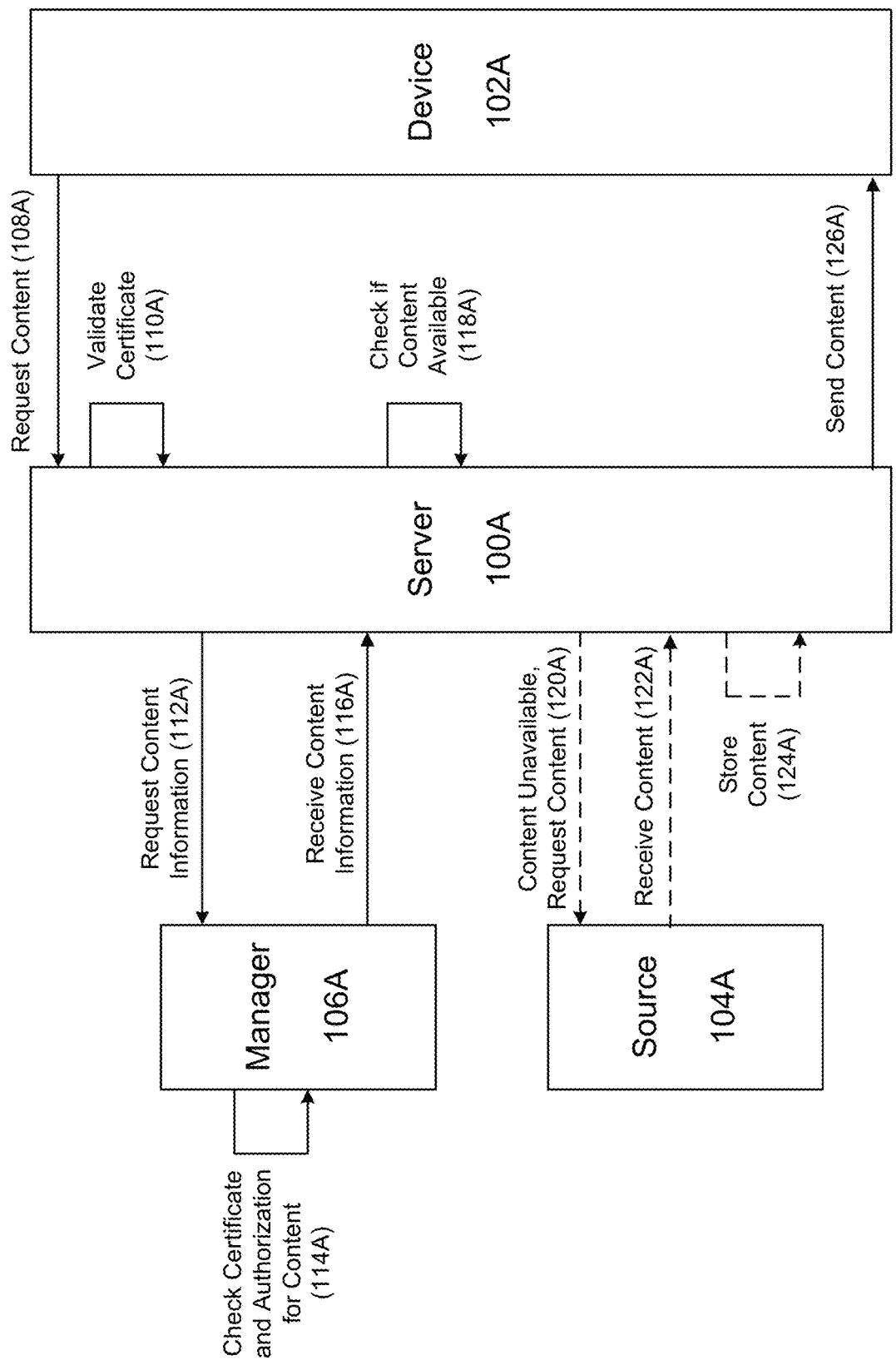
FIG. 1A is a diagram illustrating example components of a content caching system in accordance with some aspects of the present disclosure.

For purposes of reading the description of the various embodiments below, the following descriptions of the sections of the specification and their respective contents may be helpful:

Section A provides an introduction to example embodiments of a content caching system configured in accordance with some aspects of the present disclosure;

Section B describes a network environment which may be useful for practicing embodiments described herein;

Section C describes a computing system which may be useful for practicing embodiments described herein;

Section D describes a cloud computing environment which may be useful for practicing embodiments described herein;

Section E describes example mobility management systems which may be useful for practicing embodiments described herein;

Section F provides a more detailed description of example embodiments of the content caching system introduced above in Section A; and Section G describes example implementations of methods, systems/devices, and computer-readable media in accordance with the present disclosure.

A. Introduction to Illustrative Embodiments of a Content Caching System

Content such as software applications may be provided as part of a distribution process of a mobility management system or mobile device management (MDM) platform (e.g., such as those shown in FIGS. 5 and 6 and discussed below). While applications may be served from a CDN, many applications may be large in size and take undesirable amounts of time to download to devices. Multiple devices may use the same network channel to retrieve large applications simultaneously which may cause network congestion and affect network availability for critical application downloads. Even though the same applications may be targeted for multiple devices, each device may download the same application content from the Internet or WAN. This may result in higher WAN costs and slower application downloads for end users.

An office-based caching system (referred to as "caching system") may be implemented to achieve greater WAN bandwidth optimization. The caching system may retrieve content (e.g., software applications) from a primary office or cloud server and cache the content at secondary offices or locations. This may allow clients at the secondary offices to retrieve or download the content locally instead of using WAN bandwidth to retrieve the content from a content server at the primary office. The content may be stored at secondary offices on a content cache server, which may also be referred to as a cache content server (referred to herein as a "cache server"). An example of a caching system is BRANCHCACHE provided by Microsoft Corporation of Redmond, Wash.

Once the content is stored locally at a secondary office, other clients at the secondary office may attempt to retrieve the content but may retrieve content information instead of the actual content. The content information may include hashes that are smaller than the actual content. Clients at the secondary office may use the content information to find the content from the cache server in the secondary office. However, some caching systems may only be compatible with certain operating systems or distribution platforms and may not allow administrators the flexibility to leverage the caching system as much as desired. Further, caching systems may be unable to seed content and may require that content first be seeded to the cache server. Additionally, native MDM clients may not support application installations in executable file formats (i.e., EXE files) and thus MDM clients may encounter compatibility issues when trying to install certain applications.

A content cache service (referred to as "cache service") may improve upon caching systems and may allow for the desired flexibility to be achieved. The cache service may act as a content provider for devices enrolled in the MDM platform. Enrolled devices may access content via secondary offices and may leverage caching systems to allow devices enrolled with an endpoint management (EM) platform or system (also referred to as a "manager") to use Peer-to-Peer (P2P) networking for speeding up content downloads. The cache service may support a caching system and allow authentication from MDM clients or other clients of the manager in order to securely download content. Devices enrolled with the manager may also obtain EXE application payloads from the cache service.

The EM platform or system (manager) may be similar to the mobility management systems described below and shown in FIG. 5 and FIG. 6. The manager may be a solution for managing endpoints. The manager may offer mobile device management (MDM) and mobile application management (MAM) capabilities. Further, device and application policy management may be facilitated by the manager and application delivery to clients may be facilitated by the manager.

Using the techniques and features described in the present disclosure, WAN bandwidth optimization may be improved and content download speed may be increased by leveraging caching systems through the cache service. The cache service may also add an authentication layer to allow for more secure content downloads and may support various application installation formats including modern application formats, Microsoft or Windows installer (i.e., MSI) and EXE.

In various implementations, the cache service may be a HyperText Transfer Protocol (HTTP) service running on a cache server. The cache service may download binary content (e.g., of an application requested by a client) from a source location (e.g., a CDN) on-demand, and seed the content to the cache server. Clients enrolled with the manager, which may support a caching system protocol, may receive content metadata from a caching system service. If a peer of a client requesting the content has the content, the client may receive the content from the peer using supported P2P capabilities. The cache service may be installed on a server enabled with the caching system (i.e., a cache server). To authenticate an MDM client application download request, a device certificate authentication (CA) may be downloaded from the manager and installed on the cache server. A P2P policy may be configured with a cache service endpoint. During the P2P policy configuration, a hostname of the cache server or cache service may be provided to the MDM platform. The hostname may be used to prepare an application download uniform resource locator (URL). The application download URL may be referenced in application metadata.

As part of an MDM synchronization with the device, the manager may push the cache service endpoint to the device. During the MDM synchronization, the device (e.g., device 102A of FIG. 1A) may receive the application metadata from the manager (e.g., manager 106A of FIG. 1A). The device may use the application download URL referenced in the application metadata to download the application. The application metadata may, for example, include a product code, product version, download URL and other details. During the application installation, the product code and the product version may be verified. If this verification fails, then the application installation may fail. Once the device receives the application metadata, the device may send a notification to the manager accordingly. The device may use the application metadata to download and install the application on the device, which may be a background process. If the download and application installation are successful, the device may notify the manager that application installation is complete. If the application installation fails, the device may notify the manager of an error (e.g., provide an error code). The manager may also push a script to the device to enable a caching system setting via a manager policy.

As part of a DM Agent synchronization with the device. The DM Agent running on the device (e.g., device 102B of FIG. 1B) may receive data from the manager (e.g., manager 106B of FIG. 1B). The format of the data may be Java Script Object Notation (JSON). The data (e.g., JSON data) may include a content or application download URL, a Globally Unique Identifier (GUID), a timestamp, and/or a random string, among other items. The device may use a signature, timestamp and/or random string as headers to invoke a content or application download request. If the download and application installation are successful, the device may notify the manager that application installation is complete. If the application installation fails, the device may notify the manager of an error (e.g., provide an error code)

During an application installation, the first download may be delivered via the WAN but subsequent downloads (of the same application data) may be served from a peer of the device. This may increase optimization of WAN bandwidth usage and increase application download speed.

Figure 1B:
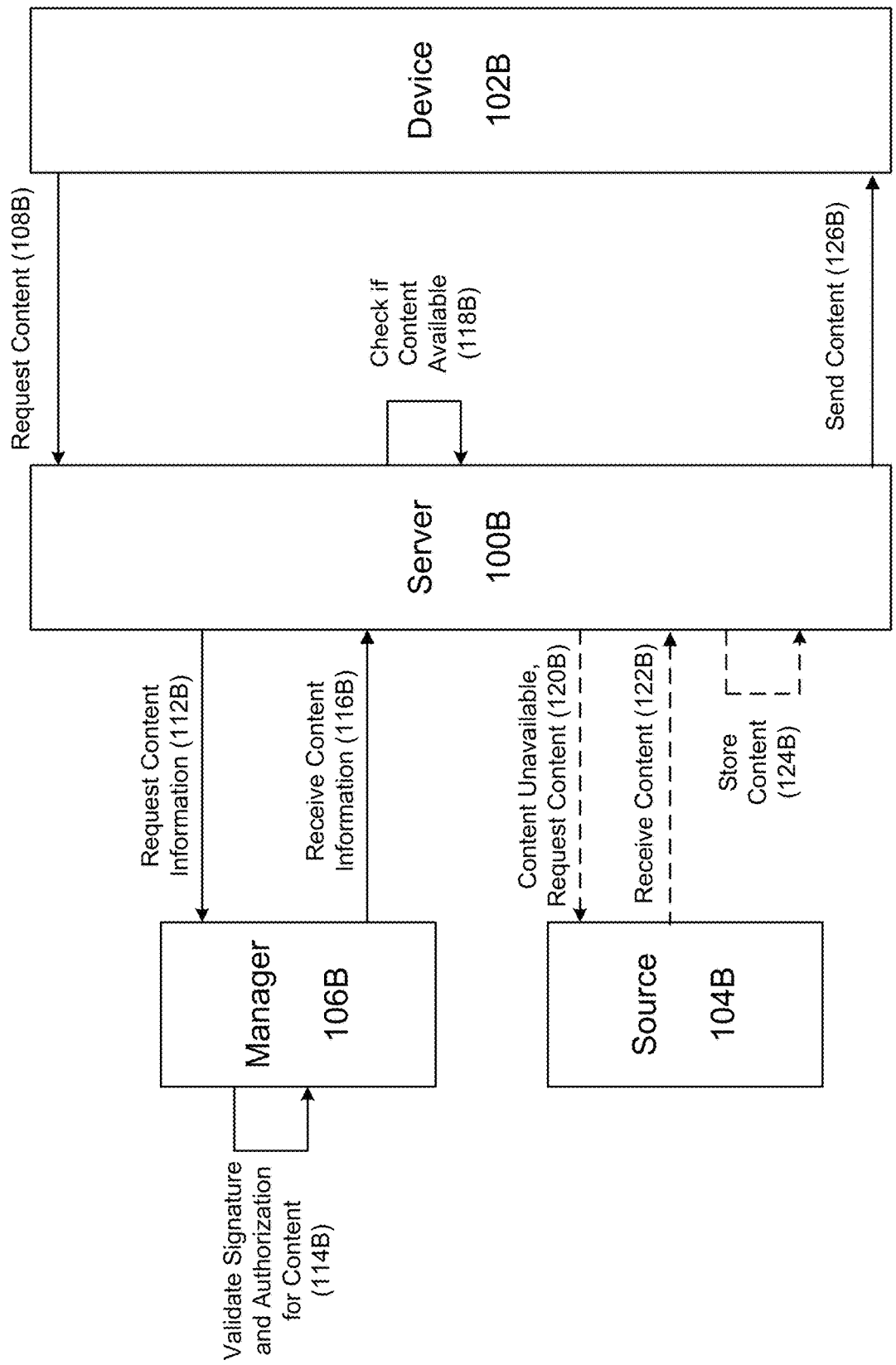
FIG. 1B is also a diagram illustrating example components of a content caching system caching in accordance with some aspects of the present disclosure.

A native MDM client that may exist as part of a device operating system (e.g., WINDOWS by Microsoft Corporation of Redmond, Wash.) may download and install modern applications and MSI applications but may be unable to download EXE applications. A device management (DM) agent may be configured to support EXE application downloads and installations and may be implemented with Background Intelligent Transfer Service (BITS) protocol to work with the caching system. In this way, the DM agent may perform actions or operations that are not supported by the native MDM client or agent. Thus, as illustrated in FIG. 1A and FIG. 1B and described below, the device may communicate with the cache service using a native MDM client process (e.g., for modern applications or MSI applications) or a DM agent process (e.g., for EXE applications) to download binary content (e.g., of an application) using the cache service endpoint. It should be noted that FIG. 1A and FIG. 1B are shown separately for illustrative purposes only and that the components in FIGS. 1A and 1B may the similar or the same in various implementations.

Referring now to FIG. 1A, a caching system may include a server 100A. Server 100A may be a cache server and may run a cache service as described above. In some implementations, server 100A shown in FIG. 1A may correspond to server 204(1) described in Section B below in connection with FIG. 2. Server 100A may be in communication with clients such as device 102A (which may run a native MDM client), source 104A (e.g., a CDN), and manager 106A (e.g., an EM system) via a network and/or the Internet. In some implementations, device 102A shown in FIG. 1A may correspond to client 202(1) described in Section B below in connection with FIG. 2. Further, in some implementations, manager 106A shown in FIG. 1A may correspond to system 500 or system 600 described in Section E below in connection with FIG. 5 and FIG. 6, respectively.

In some implementations, server 100A may receive (108A) a request from device 102A to download content (e.g., an MSI application). For example, device 102A may invoke a cache service application programming interface (API) to download content. Server 100A may also validate (110A) device 102A using a device certificate. For example, the cache service running on server 100A may authenticate device 102A using a device certificate or CA for device 102A. Further, server 100A may request (112A) content (e.g., the MSI application) information from manager 106A. For example, the cache service may use the device certificate to get application download information from manager 106A for device 102A.

Manager 106A may check (114A) the device certificate and authorization for device 102A to access the content. For example, manager 106A may validate the device certificate, identify that device 102A is enrolled with manager 106A, and verify authorization for the requested application for device 102A. Further, server 100A may receive (116A) content (e.g. the MSI application) information from manager 106A. For example, if device 102A is authorized to download the requested application, manager 106A may send the application download information to the cache service on server 100A. The application download information may include a download URL for a source for the application (e.g., source 104A) and an application hash. If device 102A is not authorized to download the requested application, manager 106A may notify the cache service that there is an error.

The content (e.g., the MSI application) may already be stored locally at server 100A and may be available from server 100A. Server 100A may check (118A) if the content is available locally. For example, if the application is available locally, the cache service may compare the application hash with a local file hash corresponding to the application. If the application hash matches the local file hash, the cache service may serve the application locally to device 102A. In other words, if the hashes match and the content is available locally, server 100A may send (126A) the content to device 102A.

If the hashes do not match and the content (e.g., the MSI application) is not available locally (i.e., from server 100A), server 100A may request (120A) the content from source 104A (e.g., a CDN). For example, if the application hash does not match the local file hash, the application may have been modified since the last download and may need to be downloaded from the CDN again. Server 100A may receive (122A) the content from source 104A. For example, the cache service running on server 100A may download the application from the CDN using a CDN download URL, which may have been included in the application download information.

Server 100A may store (124A) the content (e.g., the MSI application) locally so that it may be served to clients locally. Further, server 100A may send (126A) the content to device 102A. For example, once the application is downloaded successfully (and stored locally), the cache service may start serving the application to device 102A.

Referring now to FIG. 1B, a caching system may include a server 100B. Server 100B may be a cache server and may run a cache service as described above. Further, in some implementations, server 100B shown in FIG. 1B may correspond to server 204(1) described in Section B below in connection with FIG. 2. Server 100B may be in communication with clients such as device 102B (which may run a DM agent implemented with BITS protocol), source 104B (e.g., a CDN), and manager 106B (e.g., an EM system) via a network and/or the Internet. In some implementations, device 102B shown in FIG. 1B may correspond to client 202(1) described in Section B below in connection with FIG. 2. Further, in some implementations, manager 106B shown in FIG. 1B may correspond to system 500 or system 600 described in Section E below in connection with FIG. 5 and FIG. 6, respectively. An administrator may configure a P2P certificate on manager 106B (i.e., the EM system). The P2P certificate may be used to sign an EXE application download URL. When the DM agent synchronizes to manager 106B, manager 106B may provide the EXE application download URL and signature.

In some implementations, server 100B may receive (108B) a request from device 102B to download content (e.g., an EXE application). For example, the cache service running on server 100B may receive an application download request from the DM agent running on device 102B. Further, server 100B may request (112B) content (e.g., the EXE application) information from manager 106B. For example, the cache service running on server 100B and may use a signature to get the application download information from manager 106B.

The signature may be used by the manager and/or cache service to authenticate and/or authorize the client. The manager may generate a P2P certificate as a prerequisite to the P2P feature. The certificate may be used to create the signature. When the DM Agent running on the client (e.g., device 102B) requests the application metadata, the manager (e.g., manager 106B) may provide the application metadata which may include the content or application download URL (which may be a cache server URL) and signature. The seed for this signature may be a URL path, a timestamp, and/or a random string. The timestamp and/or random string may also be included in the application metadata.

Once the DM agent running on the client (e.g., device 102B) receives the application metadata, it may use the signature as an authorization header and may send the content or application download request to the cache server (e.g., server 100B). The DM agent may include the timestamp and random string as custom headers in the request. Upon receiving the request from the client (e.g., device 102B), the cache server (e.g., server 100B) may retrieve the signature, time stamp and random string from the headers and extract a URL path from the request. The cache server (e.g., server 100B) may use the signature as an authorization header and a URL path, timestamp and random string as custom headers and request download content information from the manager (e.g., manager 106B). The manager may now validate the signature with its certificate. The URL path, timestamp and random string may be used as a seed to validate the signature. If the signature is validated, the manager may recognize the client as authorized to access the content or application and may return the content information (e.g., a source URL and hash). The random string may be used to strengthen the signature and the timestamp may indicate when the signature expires.

Manager 106B may validate (114B) the signature and authorization for device 102B to access the content (e.g., the EXE application). For example, manager 106B may validate the signature (using the P2P certificate) and authorization for device 102B to download the application. Further, server 100B may receive (116B) content (e.g. the EXE application) information from manager 106B. For example, if the signature is validated by manager 106B, manager 106B may send the application download information to the cache service on server 100B. The application download information may include a download uniform resource locator (URL) for a source for the application (e.g., source 104B) and an application hash. If device 102B is not authorized to download the requested application, manager 106B may notify the cache service that there is an error.

The content (e.g., the EXE application) may already be stored locally at server 100B and may be available from server 100B. Server 100B may check (118B) if the content is available locally. For example, if the application is available locally, the cache service may compare the application hash with a local file hash corresponding to the application. If the application hash matches the local file hash, the cache service may serve the application locally to device 102B. For example, if the hashes match and the content is available locally, server 100B may send (126B) the content to device 102B.

If the hashes do not match and the content (e.g., the EXE application) is not available locally (i.e., from server 100B), server 100B may request (120B) the content from source 104B (e.g., a CDN). For example, if the application hash does not match the local file hash, the application may have been modified since the last download and may need to be downloaded from the CDN again. Server 100B may receive (122B) the content from source 104B. For example, the cache service running on server 100B may download the application from the CDN using a CDN download URL, which may have been included in the application download information.

Server 100B may store (124B) the content (e.g., the EXE application) locally so that it may be served to clients locally. Server 100B may send (126B) the content to device 102B. For example, once the application is downloaded successfully (and stored locally), the cache service may start serving the application to device 102B (e.g., via the DM agent).

In this way, the techniques and features described in the present disclosure may be implemented to achieve more efficient use of network bandwidth when downloading content or applications because the cache service may reduce reliance on a content server at a main office or CDN outside a secondary location and allow for increased reliance on a cache server at the secondary location itself.

Additional details and example implementations of embodiments of the present disclosure are set forth below in Section F, following a description of example systems and network environments in which such embodiments may be deployed.

B. Network Environment

Figure 2:
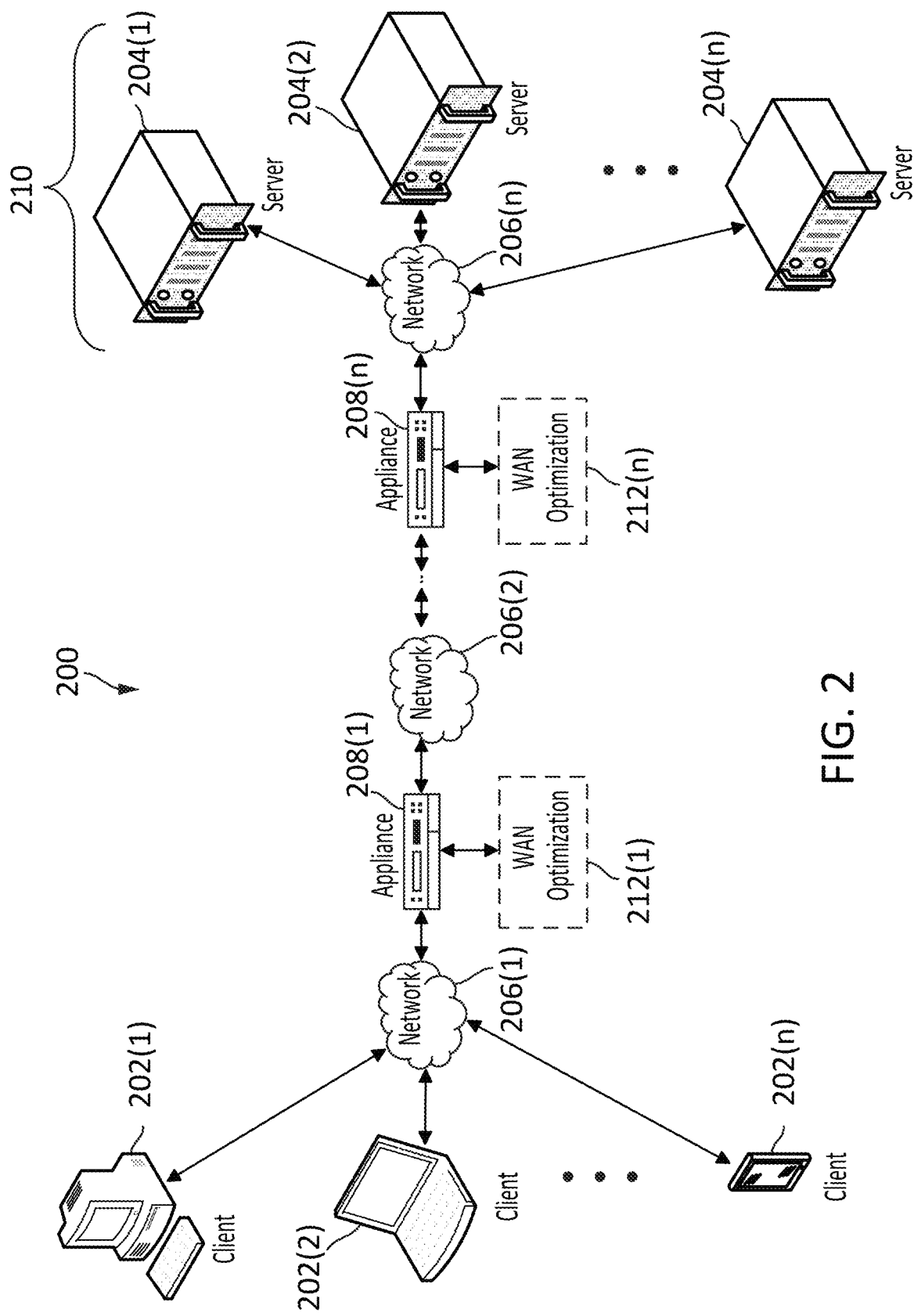
FIG. 2 is a diagram of a network environment in which some components of content caching systems disclosed herein may be deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
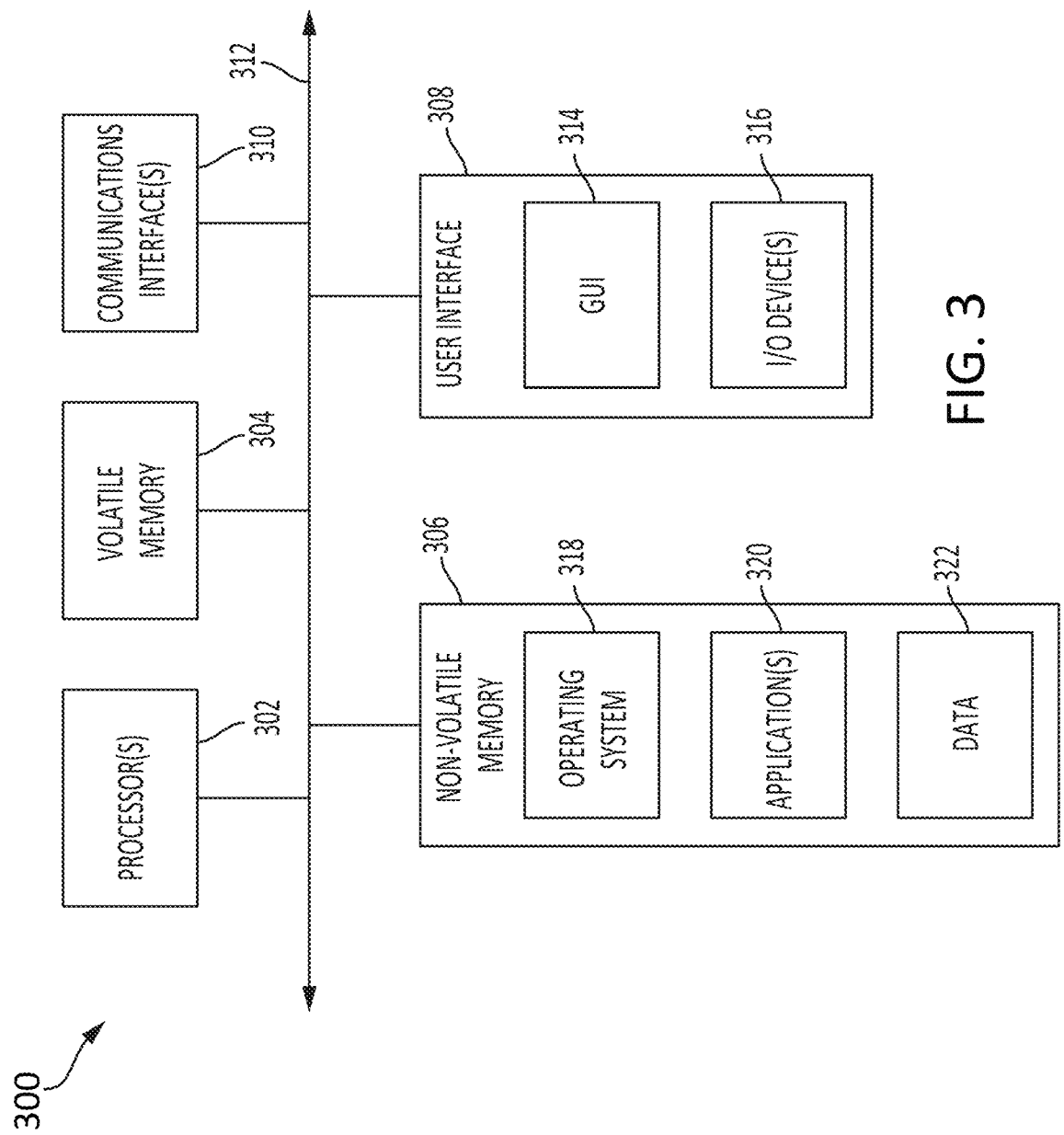
FIG. 3 is a diagram of an example computing system that may be used to implement one or more components of the network environment shown in FIG. 2.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316.

Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Cloud Computing Environment

Figure 4:
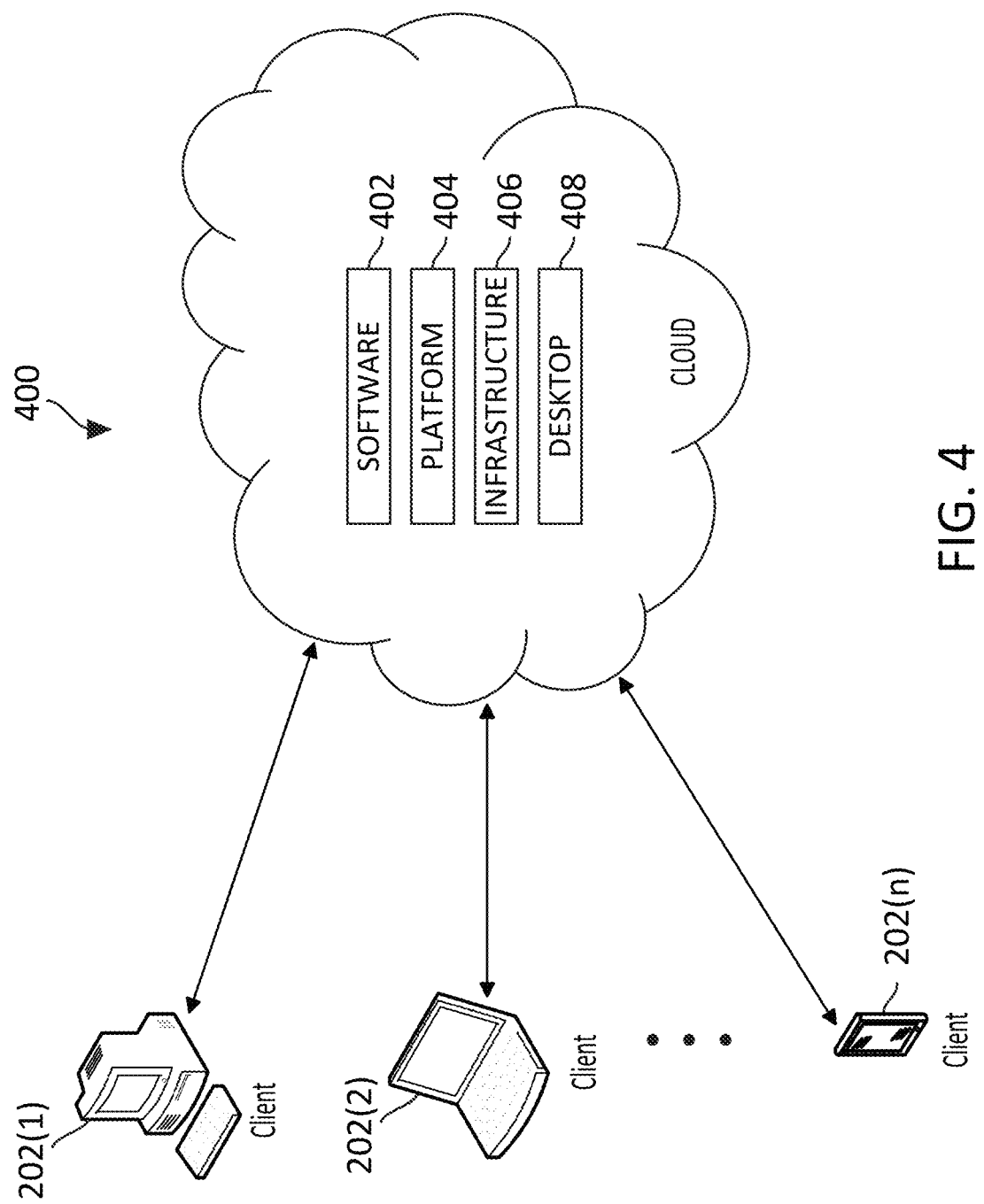
FIG. 4 is a diagram of a cloud computing environment in which various aspects of the disclosure may be implemented.

Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Mobility Management

Figure 5:
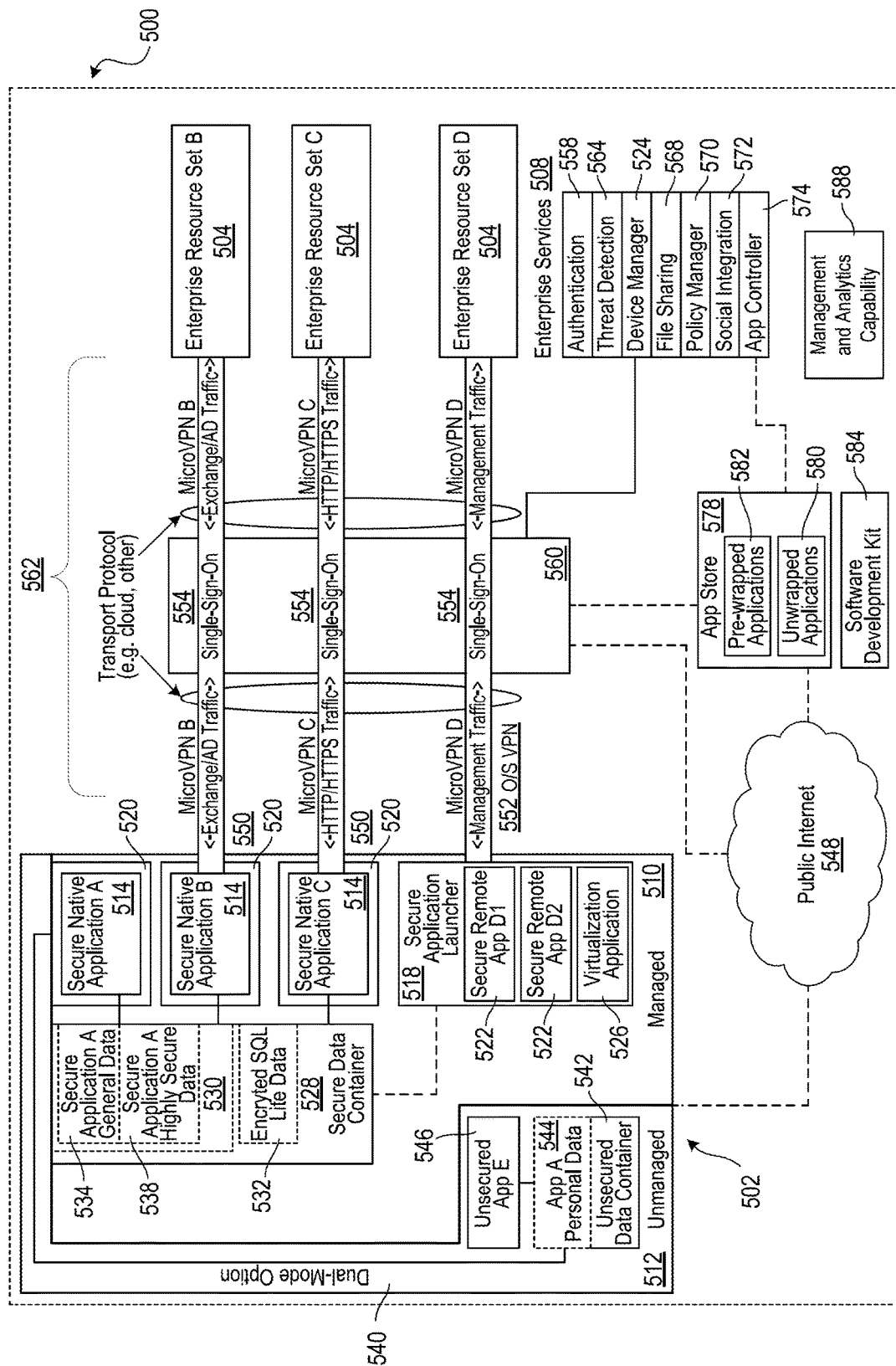
FIG. 5 depicts an example mobility management system in accordance with various aspects of the disclosure.

FIG. 5 shows an example of an enterprise mobility technical architecture (or system) 500 for use in a "Bring Your Own Device" (BYOD) environment. The architecture 500 may enable a user of a mobile device 502 to both access enterprise or personal resources from a mobile device 502 and use the mobile device 502 for personal use. The user may, for example, access such enterprise resources 504 or enterprise services 508 using a mobile device 502 that is purchased by the user or a mobile device 502 that is provided by the enterprise to the user. The user may utilize the mobile device 502 for business use only or for business and personal use. In some implementations, the mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508). Such policies may, for example, include mobile device management policies, mobile application management policies, mobile data management policies, or some combination of mobile device, application, and mobile data management policies. A mobile device 502 that is managed through the application of mobile device management policies may be referred to as an "enrolled device."

In some implementations, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may include secure applications. In other implementations, all applications may execute in accordance with a set of one or more policy files which may be received separate from the application, and which may define one or more security parameters, features, resource restrictions, and/or other access controls that may be enforced by the mobile device management system when that application is executing on the mobile device 502. By operating in accordance with their respective policy file(s), the applications may be allowed or restricted from communications with one or more other applications and/or resources, thereby creating a virtual partition. Thus, as used herein, a "partition" may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to be able to communicate only with other managed applications and trusted enterprise resources, thereby creating a virtual partition that is not accessible by unmanaged applications and devices.

The secure applications may, for example, be email applications, web browsing applications, software-as-a-service (SaaS) access applications, Windows Application access applications, or the like. The secure applications may be secure native applications 514, secure remote applications 522 executed by a secure application launcher 518, virtualization applications 526 executed by a secure application launcher 518, or the like. The secure native applications 514 may be wrapped by a secure application wrapper 520. The secure application wrapper 520 may include, for example, integrated policies that may be executed on the mobile device 502 when the secure native application 514 is executed on the mobile device 502. The secure application wrapper 520 may include metadata that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, or the like. The resources used on the mobile device 502 by the virtualization applications 526 executed by a secure application launcher 518 may include user interaction resources, processing resources, or the like. The user interaction resources may be used, for example, to collect and transmit keyboard input, mouse input, camera input, tactile input, audio input, visual input, gesture input, or the like. The processing resources may be used, for example, to present a user interface, process data received from the enterprise resources 504, or the like. The resources used at the enterprise resources 504 by the virtualization applications 526 executed by a secure application launcher 518 may include, for example, user interface generation resources, processing resources, or the like. The user interface generation resources may, for example, be used to assemble a user interface, modify a user interface, refresh a user interface, or the like. The processing resources may, for example, be used to create information, read information, update information, delete information, or the like. For example, the virtualization application 526 may record data representing user interactions with a graphical user interface (GUI) and may communicate such user interaction data to a server application such that the server application may use the user interaction data as an input to an application operating on the server. In such an arrangement, an enterprise may elect to maintain the application on the server side as well as data, files, etc., associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502, so the enterprise may elect to provide the mobile user access to such applications through virtualization techniques. As another example, the enterprise may have large complex applications with large and complex data sets (e.g., material resource planning applications) where it would be very difficult, or otherwise undesirable, to customize the application for the mobile device 502, so the enterprise may elect to provide access to such applications through virtualization techniques. As yet another example, the enterprise may have an application that maintains highly secured data (e.g., human resources data, customer data, and/or engineering data) that may be deemed by the enterprise as too sensitive for even the secured mobile environment, so the enterprise may elect to use virtualization techniques to permit mobile access to such applications and data. An enterprise may, for example, elect to provide both fully secured and fully functional applications on the mobile device 502 as well as a virtualization application 526 to allow access to applications that are deemed more properly operated on the server side. In some implementations, the virtualization application 526 may store some data, files, etc., on the mobile device 502 in one of the secure storage locations. An enterprise may, for example, elect to allow certain information to be stored on the mobile device 502 while not permitting other information.

In connection with the virtualization application 526, as described herein, the mobile device 502 may have a virtualization application 526 that is designed to present one or more GUIs and then record user interactions with such GUIs. The virtualization application 526 may communicate data representing such user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

In some implementations, the secure applications 514 may access data stored in a secure data container 528 in the managed partition 510 of the mobile device 502. The data secured in the secure data container 528 may be accessed, for example, by the secure native applications 514, secure remote applications 522 executed by a secure application launcher 518, virtualization applications 526 executed by a secure application launcher 518, or the like. The data stored in the secure data container 528 may include files, databases, or the like. The data stored in the secure data container 528 may, for example, include data restricted to a specific secure application 530, shared among secure applications 532, or the like. Data restricted to a secure application may, for example, include secure general data 534 and highly secure data 538. Secure general data may use a strong form of encryption, such as Advanced Encryption Standard (AES) 128-bit encryption or the like, while highly secure data 538 may use a very strong form of encryption, such as AES 256-bit encryption. Data stored in the secure data container 528 may be deleted from the mobile device 502 upon receipt of a command from the device manager services 524. In some implementations, the secure applications (e.g., 514, 522, and 526) may have a dual-mode option 540. Such a dual-mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may, for example, include personal data 544. In some implementations, the data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may, for example, want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). Such an operation may be referred to as a "selective wipe." With the enterprise and personal data arranged in accordance to the aspects described herein, an enterprise may perform a selective wipe.

The mobile device 502 may connect to enterprise resources 504 and enterprise services 508 at an enterprise, to the public Internet 548, or the like. In some implementations, the mobile device 502 may connect to enterprise resources 504 and/or enterprise services 508 through virtual private network (VPN) connections. Such VPNs, which may also be referred to as microVPNs or application-specific VPNs, may be specific to particular applications (as illustrated by microVPNs 550), particular devices, particular secured areas on the mobile device (as illustrated by O/S VPN 552), or the like. For example, each of the wrapped applications in the secured area of the mobile device 502 may access enterprise resources through an application specific VPN such that access to the VPN would be granted based on attributes associated with the application, possibly in conjunction with user or device attribute information. The VPN connections may, for example, carry Microsoft Exchange traffic, Microsoft Active Directory traffic, HyperText Transfer Protocol (HTTP) traffic, HyperText Transfer Protocol Secure (HTTPS) traffic, application management traffic, or the like. In some implementations, the VPN connections may support and enable a single-sign-on authentication processes 554. Such single-sign-on processes may allow a user to provide a single set of authentication credentials, which may then be verified by an authentication service 558. The authentication service 558 may then grant to the user access to multiple enterprise resources 504, without requiring the user to provide authentication credentials to each individual enterprise resource 504.

As illustrated, in some implementations, the VPN connections may be established and managed by an access gateway 560. The access gateway 560 may include performance enhancement features that may manage, accelerate, and/or improve the delivery of enterprise resources 504 to the mobile device 502. The access gateway 560 may also re-route traffic from the mobile device 502 to the public Internet 548, thus enabling the mobile device 502 to access publicly available and unsecured applications that run on the public Internet 548. The mobile device 502 may connect to the access gateway via a transport network 562. The transport network 562 may use one or more transport protocols and may, for example, include a wired network, wireless network, cloud network, local area network, metropolitan area network, wide area network, public network, private network, or the like.

The enterprise resources 504 may, for example, include email servers, file sharing servers, SaaS applications, Web application servers, Windows application servers, or the like. Email servers may include Exchange servers, Lotus Notes servers, or the like. File sharing servers may include ShareFile servers, or the like. SaaS applications may include Salesforce, or the like. Windows application servers may include any application server that is built to provide applications that are intended to run on a local Windows operating system, or the like. The enterprise resources 504 may be premise-based resources, cloud-based resources, or the like. The enterprise resources 504 may be accessed by the mobile device 502 directly or through the access gateway 560. The enterprise resources 504 may be accessed by the mobile device 502 via the transport network 562.

The enterprise services 508 may, for example, include authentication services 558, threat detection services 564, device manager services 524, file sharing services 568, policy manager services 570, social integration services 572, application controller services 574, or the like. Authentication services 558 may include user authentication services, device authentication services, application authentication services, data authentication services, or the like. Authentication services 558 may use certificates. Such use certificates may be stored on the mobile device 502, by the enterprise resources 504, or the like. The certificates stored on the mobile device 502 may be stored in an encrypted location on the mobile device 502, the certificate may be temporarily stored on the mobile device 502 for use at the time of authentication, or the like. Threat detection services 564 may include intrusion detection services, unauthorized access attempt detection services, or the like. Unauthorized access attempt detection services may prohibit unauthorized attempts to access devices, applications, data, or the like. Device management services 524 may include configuration, provisioning, security, support, monitoring, reporting, and/or decommissioning services. File sharing services 568 may include file management services, file storage services, file collaboration services, or the like. Policy manager services 570 may include device policy manager services, application policy manager services, data policy manager services, or the like. Social integration services 572 may include contact integration services, collaboration services, integration with social networks such as Facebook, Twitter, and LinkedIn, or the like. Application controller services 574 may include management services, provisioning services, deployment services, assignment services, revocation services, wrapping services, or the like.

As shown in FIG. 5, in some implementations, the enterprise mobility technical architecture 500 may include an application store 578. The application store 578 may include unwrapped applications 580, pre-wrapped applications 582, or the like. Applications may be populated in the application store 578 from the application controller services 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller services 574.

In some implementations, the enterprise mobility technical architecture 500 may include a management and analytics capability 588. The management and analytics capability 588 may provide information related to how resources are used, how often resources are used, or the like. Resources may include devices, applications, data, or the like. How resources are used may include which devices download which applications, which applications access which data, or the like. How often resources are used may include how often an application has been downloaded, how many times a specific set of data has been accessed by an application, or the like.

Figure 6:
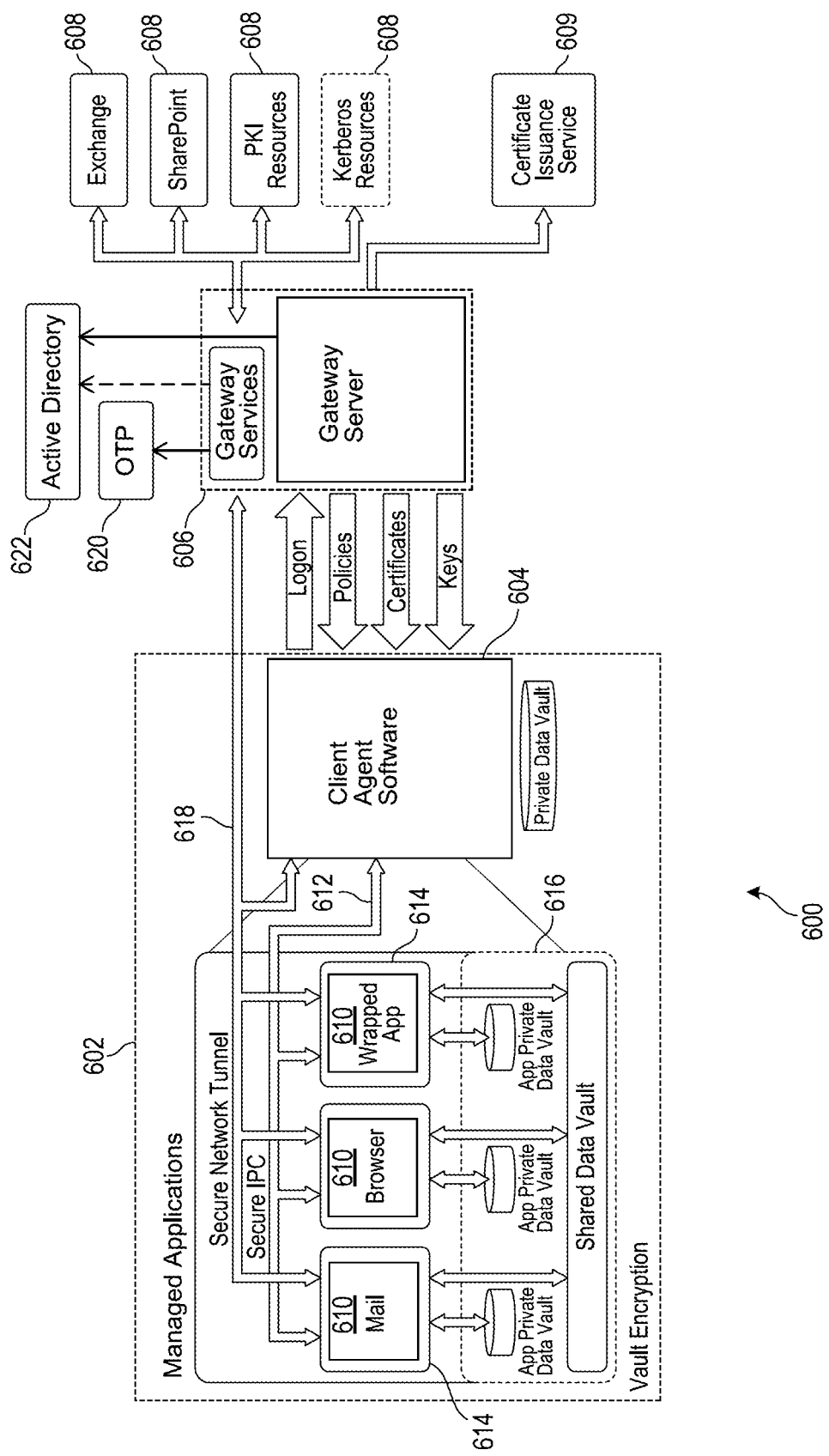
FIG. 6 depicts another example mobility management system in accordance with various aspects of the disclosure.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5. It may, however, include additional of different features not mentioned above.

In this case, the left-hand side represents an enrolled mobile device 602 with a client agent 604, which may interact with gateway server 606 (which includes Access Gateway and application controller functionality) to access various enterprise resources 608 and services 609, such as Exchange, Sharepoint, public-key infrastructure (PKI) Resources, Kerberos Resources, Certificate Issuance service, as shown on the right-hand side above. Although not specifically shown, the mobile device 602 may also interact with an enterprise application store (StoreFront) for the selection and downloading of applications.

The client agent 604 may act as the UI (user interface) intermediary for Windows apps/desktops hosted in an Enterprise data center, which may, for example, be accessed using the High-Definition User Experience (HDX)/Independent Computing Architecture (ICA) display remoting protocol. The client agent 604 may also support the installation and management of native applications on the mobile device 602, such as native iOS or Android applications. For example, the managed applications 610 (mail, browser, wrapped application, etc.) shown in the figure above may all be native applications that execute locally on the mobile device 602. Client agent 604 and the application management framework of this architecture may act to provide policy driven management capabilities and features, such as connectivity and single sign on (SSO) functionality, to enterprise resources/services 608. The client agent 604 may handle primary user authentication to the enterprise, normally to Access Gateway (AG) 606 with SSO to other gateway server components. The client agent 604 may, for example, obtain policies from gateway server 606 to control the behavior of the managed applications 610 on the mobile device 602.

The Secure InterProcess Communication (IPC) links 612 between the native applications 610 and client agent 604 may represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Further, the IPC channel 612 may allow the application management framework 614 to invoke user interface functions implemented by client agent 604, such as online and offline authentication.

Communications between the client agent 604 and the gateway server 606 may be essentially an extension of the management channel from the application management framework 614 wrapping native managed applications 610. The application management framework 614 may request policy information from client agent 604, which in turn may request it from gateway server 606. The application management framework 614 may request authentication, and client agent 604 may log into the gateway services part of gateway server 606 (for example, Citrix Gateway). The client agent 604 may also call supporting services on the gateway server 606, which may produce input material to derive encryption keys for the local data vaults 616, or may provide client certificates which may enable direct authentication to PKI protected resources, as more fully explained below.

In more detail, the application management framework 614 may "wrap" each managed application 610. This may be incorporated via an explicit build step, or via a post-build processing step. The application management framework 614 may, for example, "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also be managed by appropriate interactions between the managed applications 610 and the client agent 604. Vaults 616 may be available only after online authentication, or may be made available after offline authentication if allowed by policy. The initial use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. The client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 may have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

The above-described architecture may also support the incorporation of various other security features. For example, the gateway server 606 (including its gateway services) in some cases may not need to validate active directory (AD) passwords. It may be left to the discretion of an enterprise whether an AD password is to be used as an authentication factor for some users in some situations. Different authentication methods may be used if a user is online or offline (i.e., connected or not connected to a network).

Step up authentication is a feature wherein the gateway server 606 may identify managed native applications 610 that are allowed to have access to highly classified data requiring strong authentication, and may ensure that access to these applications is permitted only after performing appropriate authentication, even if this means a re-authentication is required by the user after a prior weaker level of login.

Another security feature that may be provided by this solution is the encryption of the data vaults 616 (containers) on the mobile device 602. The vaults 616 may be encrypted so that all on-device data including files, databases, and configurations may be protected. For on-line vaults, the keys may be stored on the server (e.g., the gateway server 606), and for off-line vaults, a local copy of the keys may be protected by a user password or biometric validation. If or when data is stored locally on the mobile device 602 in the secure container 616, it may be preferred that a minimum of Advanced Encryption Standard 256 (AES 256) encryption algorithm be utilized.

Other secure container features may also be employed in some implementations. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to "YES." This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. Secure socket layer (SSL) certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). The key may, for example, be XORed with another key randomly generated and stored on the server side if offline access is not required. Key Derivation functions may operate such that keys generated from the user password use one or more key derivation functions (KDFs), such as Password-Based Key Derivation Function 2 (PBKDF2), rather than creating a cryptographic hash of it, as the latter may make a key susceptible to brute force or dictionary attacks.

Further, one or more initialization vectors may be used in encryption methods. An initialization vector may cause multiple copies of the same encrypted data to yield different cipher text output, thus preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it is needed. For example, login credentials may be wiped from memory after login, and encryption keys and other data inside objective-C instance variables may not be stored, as they may be easily referenced. Instead, memory may be manually allocated for these.

An inactivity timeout may be implemented, wherein after a policy-defined period of inactivity, a user session is terminated.

Data leakage from the application management framework 614 may additionally or alternatively be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of a one-time password (OTP) 620 without the use of an AD (active directory) 622 password for access to one or more applications. In some cases, some users may not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password may not be used. The gateway server 606 may provide policies to control and enforce password standards with respect to the minimum length, character class composition, and/or age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, e.g., identified by a label that is defined in gateway server 606.

The gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate Hypertext Transfer Protocol Secure (HTTPS) requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or Transport Layer Security (TLS) may also be implemented to provide additional security by requiring that a mobile device 602 be authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an (Application Programming Interface) API, such as OpenSSL. Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

F. Detailed Description of Example Embodiments of Content Caching System

As discussed above in Section A, a cache service may improve upon caching systems by acting as a content provider for devices enrolled in an EM or MDM platform. Enrolled devices may access content via secondary offices and may leverage caching systems to use Peer-to-Peer (P2P) networking for speeding up content downloads. The cache service may use one or more processes running on the cache server and perform related operations to implement the techniques and features described in the present disclosure.

Figure 7:
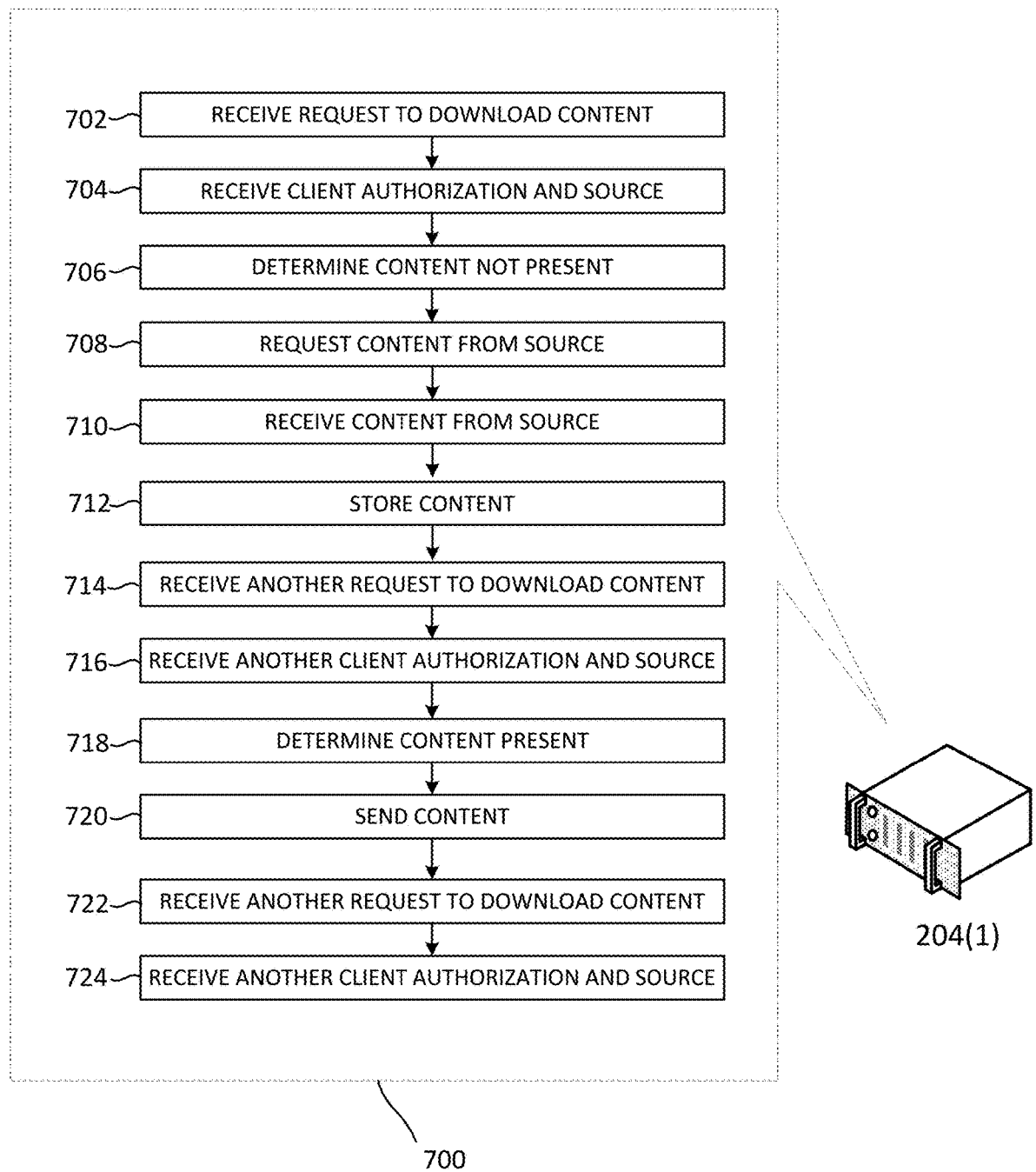
FIG. 7 shows an example content caching process involving example in accordance various aspects of the disclosure.

Referring now to FIG. 7, a method or process 700 for content caching in accordance with various implementations of the present disclosure is shown. It should be noted that while the operations of FIG. 7 are designated by reference numerals in numeric order, the operations are not required to be performed in the numeric order shown and may be performed in any order as may be practicable in various implementations. Further, some operations shown in FIG. 7 may not be performed at all in various implementations. Process 700 of FIG. 7 will be explained with reference to both FIG. 7 and the sequence diagrams shown in FIGS. 9A-9C which may illustrate interactions between various systems and devices that may be used to implement process 700, but this is for illustrative purposes only as process 700 is not intended to be limited by the sequence diagrams of FIGS. 9A-9C, and other implementations of process 700 are within the scope of the present disclosure.

Figure 9A:
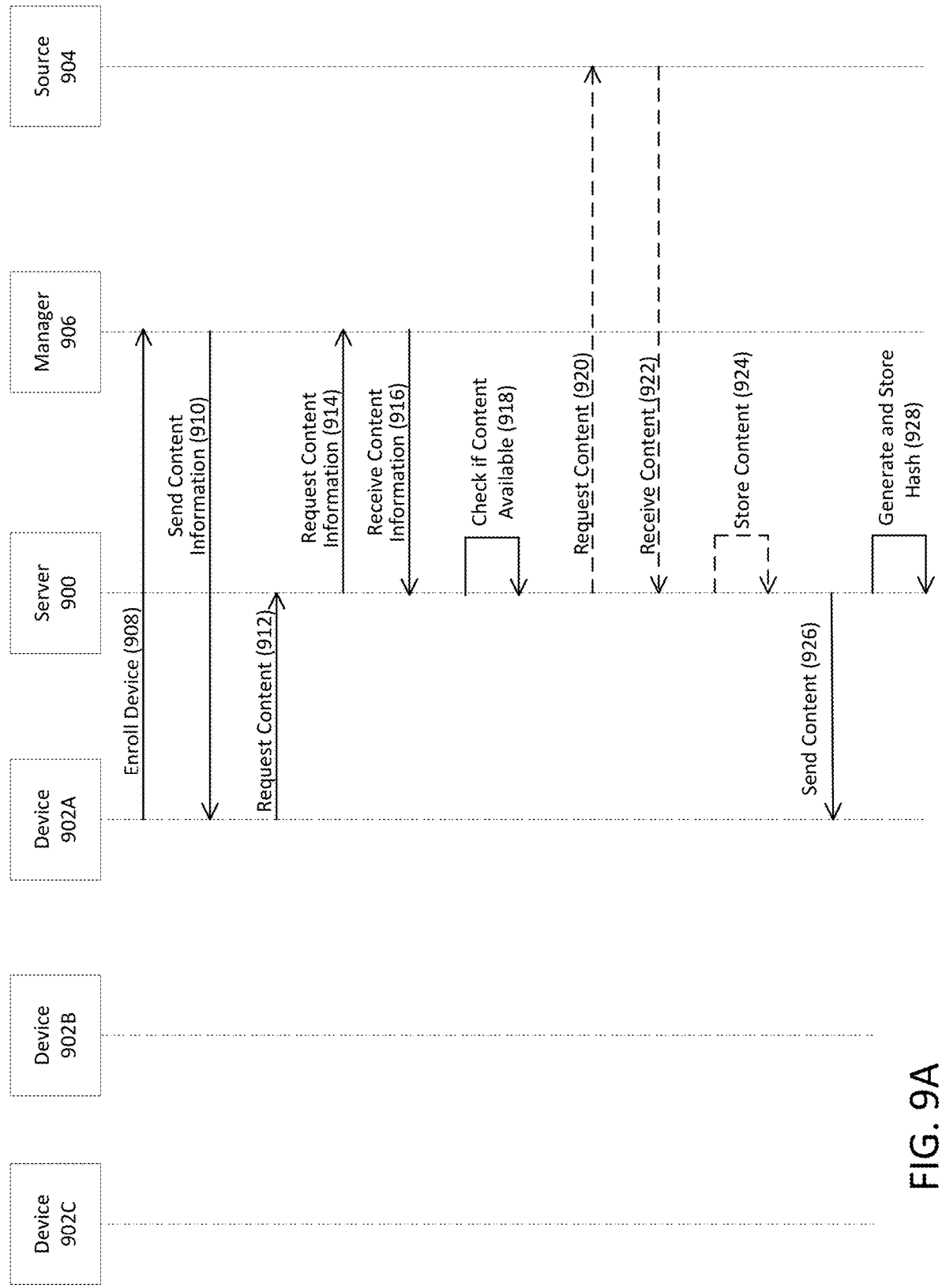
FIG. 9A shows a sequence diagram illustrating an example workflow involving the example content caching systems shown in FIGS. 1A and 1B.

Referring now also to FIG. 9A, process 700 may run on or may be implemented via server 900. In some implementations, server 900 shown in FIGS. 9A-9C may correspond to server 204(1) described in Section B above in connection with FIG. 2. Further, server 900 may be a cache server as described above.

Server 900 may be in communication with devices 902A, 902B, and 902C (i.e., clients), source 904 (e.g., a CDN), and manager 906 (i.e., an EM system) via a network or the Internet. In some implementations, devices 902A-902C shown in FIGS. 9A-9C may correspond to the clients 202(1)-202(n) described in Section B above in connection with FIG. 2. Further, in some implementations, manager 906 shown in FIGS. 9A-9C may correspond to system 500 or system 600 described in Section E above in connection with FIG. 5 and FIG. 6, respectively. Manager 906 may enroll (908) device 902A (e.g., with the EM system) and send (910) content information (e.g., application metadata) to device 902A.

The enrollment may allow the manager to configure security policies, manage applications and perform secure actions. The enrollment may be initiated by an end user of the device. A native MDM client (which may be part of an operating system running on the device) may be responsible for performing enrollment and carrying out instructions from the manager.

In some implementations, the end-user may authenticate to the manager. Upon authentication, a device certificate may be sent to the device (native MDM client). A software and hardware inventory may be performed. Once the enrollment is complete, the MDM synchronization may run and receive updates from the manager. The manager may send policies, applications, and security related metadata (e.g., in XML format) to the device. The device certificate may be used as an authentication token during the MDM synchronization.

Referring to FIGS. 7 and 9A, a first computing system (e.g., server 900) may receive (714) a request from a first client device (e.g., device 902A) to download content. For example, device 902A may request (912) the content from server 900. The request may be made, for example, in response to a user of device 902A selecting a link or URL for the content or otherwise indicating a need for the content. Server 900 may also receive (716) first information from a second computing system (e.g., manager 906). For example, server 900 may send a request (914) for content information (e.g., the first information) from manager 906 and receive (916) the content information from manager 906.

The content information or first information may correspond to the content and may be indicative of a first version of the content (e.g., an application) that device 902A is authorized (by, e.g., manager 906) to download. For example, the content information may include a content hash, application hash, or modification hash (referred to as the "first hash") corresponding to the first version of the content. The content information may also be indicative of a source (e.g., source 904) from which the first version of the content can be downloaded. In various implementations, the content information may include a source URL for the source from which the first version of the content can be downloaded.

Server 900 may also determine (718) that the first version of the content (e.g., the application) is already present on server 900 based on the first information. For example, server 900 may check (918) if the application is available locally. Determining that the first version of the content is already present on server 900 may include comparing the first hash from the first information with a second hash that is mapped to local content (e.g., local copy of the application) stored by server 900. If the first and second hashes match, server 900 may send (720) the first version of the content, or second information, to device 902A. The second information may be indicative of the first version of the content and may include the source, the source URL, and the first hash. Thus, in response to determining that the first version of the content is available from server 900, server 900 may send (926) the first version of the content to device 902A.

In some implementations, prior to receiving (714) the request (the "first request") from device 902A (the "first client device") to download the content, server 900 may receive (702) a separate request (the "second request") from a second client device (e.g., one of devices 902A, 902B, and 902C) to download the content. Server 900 may also receive (704) third information from the second client device. The third information may indicate that the second client device is authorized to download the first version of the content and the source (e.g., source 904) from which the first version of the content can be downloaded, the source URL, and the first hash.

Further, server 900 may determine (706) that the first version of the content is not already present on server 900 based on the third information. Determining that the first version of the content is not already present on server 900 may include determining that server 900 does not have any local copy of the content or that the first hash from the first information does not match the second hash (e.g. a hash that may correspond to a prior version of the content) that is mapped to local content (i.e., a local copy of the content) stored by server 900. Additionally, server 900 may request (708) the first version of the content from the source (e.g., source 904 as may be indicated by the third information) based on the first version of the content not being present on server 900. For example, and referring also to FIG. 9A, in response to determining that the first version of the content (e.g., the application) is not available from server 900, server 900 may request (920) the first version of the content from source 904.

Additionally, server 900 may receive (710) the first version of the content from source 904. For example, in response to requesting the first version of the content (e.g., the application) from source 904, server 900 may receive (922) the first version of the content from source 904. Server 900 may also store (712) the first version of the content such that it may be available for other clients that may request it and may send (926) the first version of the content to device 902A. Further, server 900 may generate and store (928) a hash that is mapped to the first version of the content.

Figure 9B:
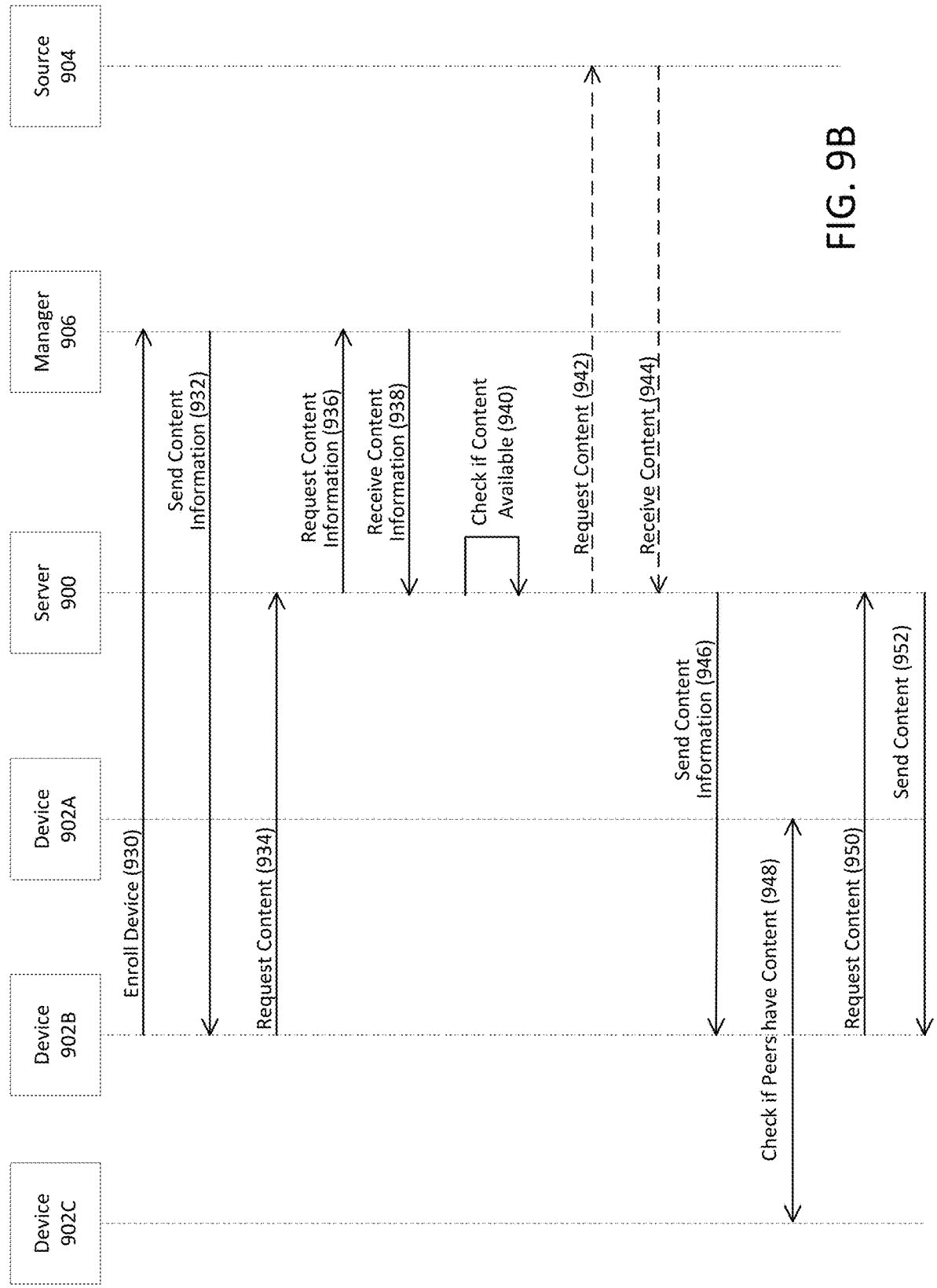
FIG. 9B is a continuation of the sequence diagram of FIG. 9A.

Referring now also to FIG. 9B, another example in accordance with various implementations of the present disclosure is shown. For example, manager 906 may enroll (930) device 902B (e.g., with the EM system) and send (932) content information (e.g., application metadata) to device 902B. Server 900 may receive a request (934) from device 902B to download the content and may request (936) the content information from manager 906. The request may be made, for example, in response to a user of device 902B selecting a link or URL for the content or otherwise indicating a need for the content. Server 900 may receive (938) the content information from manager 906. The content information may indicate that device 902B is authorized to download the content and the source (e.g., source 904) from which the content can be downloaded. In various implementations, the content information may include a source URL and a hash corresponding to the content.

Further, server 900 may determine that the content is already present on server 900 based at least in part on the content information. For example, server 900 may check (940) if the content is available locally, and if so, check whether the hash corresponding to the content matches the hash that was generated (e.g., at operation 928) and that is mapped to the local content stored by server 900. In response to determining that the hashes match, server 900 may send (952) the content to device 902B.

Alternatively, server 900 may determine that the content is not available locally or that the hashes do not match. In response to determining that the content is not available locally or that the hashes do not match, server 900 may request (942) the content from source 904 (as may be indicated by the content information) and source 904 may send the content to server 900. Server 900 may receive (944) the content from source 904 and send (946) content information related to the content (e.g., a hash corresponding to the content) to device 902B Even though the content (e.g., the second version of the content) may now be available for device 902B from server 900, device 902B (or in some implementations, server 900) may proceed to check (948) if one or more peers of device 902B (e.g., device 902A or device 902C) have the second version of the content available to provide to device 902B in order to further optimize network bandwidth usage. For example, device 902B (or server 900) may check if device 902A or device 902C have content with an associated hash that matches the hash (e.g., the third hash) corresponding to the second version of the content. If device 902A or device 902C have content with an associated hash matching the third hash, device 902B may retrieve the content from that device. If neither device 902A nor device 902C (nor any other peer device) have content with an associated hash matching the third hash, device 902B may request the second version of the content from server 900. Server 900 may receive (950) the request and send (952) the second version of the content to device 902B. Thus, the second version of the content may now be available from device 902B and device 902B may now provide the second version of the content to one or more peer devices of device 902B.

Figure 9C:
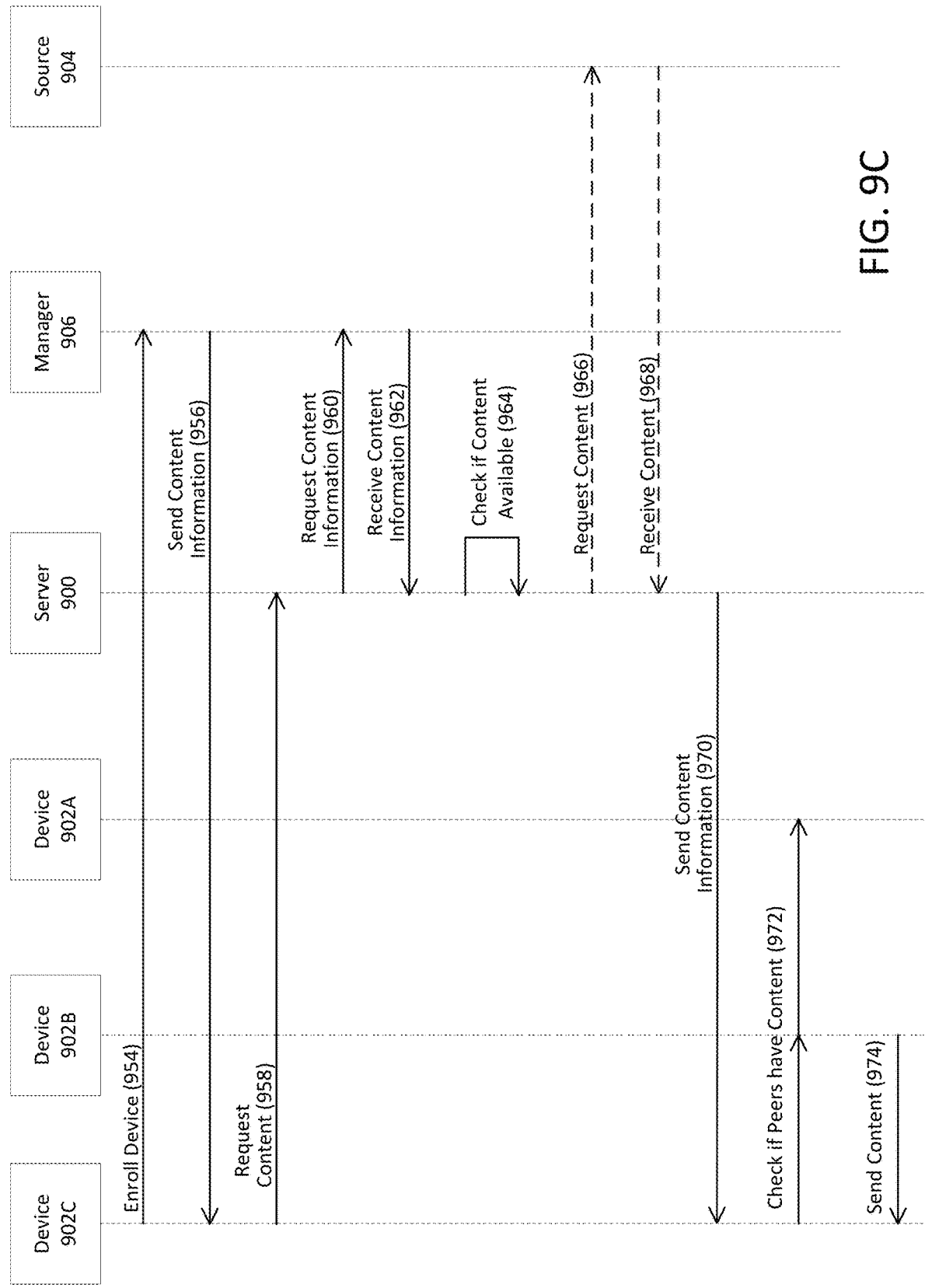
FIG. 9C a continuation of the sequence diagrams of FIGS. 9A and 9B.

Referring now also to FIG. 9C, another example in accordance with various implementations of the present disclosure is shown. For example, manager 906 may enroll (954) device 902C (e.g., with the EM system) and send (956) content information (e.g., application metadata) to device 902C. Referring also to FIG. 7, the first computing system (e.g., server 900) may receive (722) another request from a second client device (e.g., device 902C) to download content. For example, device 902C may request (958) the content from server 900. The request may be made, for example, in response to a user of device 902C selecting a link or URL for the content or otherwise indicating a need for the content. Server 900 may also receive (724) content information from the second computing system (e.g., manager 906). For example, server 900 may send a request (960) for the content information from manager 906 and receive (962) the content information from manager 906.

The content information may correspond to the content and may be indicative of a second version of the content (e.g., the application) that device 902C is authorized (by, e.g., manager 906) to download. For example, the content information may include a content hash, application hash, or modification hash (i.e., the third hash) corresponding to the second version of the content. The content information may also be indicative of a source (e.g., source 904) from which the second version of the content can be downloaded. In various implementations, the content information may include a source URL for the source from which the second version of the content can be downloaded.

Server 900 may also determine that the second version of the content (e.g., the application) is already present on server 900 based on the content information. For example, server 900 may check (964) if the application is available locally. Determining that the second version of the content is already present on server 900 may include comparing the third hash from the content information with the hash that is mapped to local content (e.g., local copy of the application) stored by server 900. Server 900 may determine that the content is not available locally or that the hashes do not match. In response to determining that the content is not available locally or that the hashes do not match, server 900 may request (966) the content from source 904 (as may be indicated by the content information) and source 904 may send the content to server 900. Server 900 may receive (968) the content from source 904 and send (970) content information related the content (e.g., a hash corresponding to the content) to device 902C.

Even though the content (e.g., the second version of the content) may now be available for device 902C from server 900, device 902C (or in some implementations, server 900) may proceed to check (972) if one or more peers of device 902C (e.g., device 902A or device 902B) have the second version of the content available to provide to device 902C in order to further optimize network bandwidth usage. For example, device 902C (or server 900) may check if device 902A or device 902B have content with an associated hash that matches the hash (e.g., the third hash) corresponding to the second version of the content. If device 902A or device 902B have content with an associated hash matching the third hash, device 902C may retrieve the content from that device. If neither device 902A nor device 902B (nor any other peer devices) have content with an associated hash matching the third hash, device 902C may request the second version of the content from server 900.

In some implementations, device 902C may determine that the second version of the content is present on device 902B (e.g., by receiving content information corresponding to the content that is stored locally on device 902B from device 902B). Device 902C may, for example, use Web Service Dynamic Discovery (WS-Discovery) protocol for content discovery on peer clients. If device 902B has content that matches content information requested by device 902C, device 902C may receive the content from device 902B. If no peer device of device 902C has the content stored locally, device 902C may receive the content from server 900.

For example, in response to determining that the second version of the content is present on device 902B, device 902C may request that device 902B send the second version of the content to device 900C. Additionally, in response to receiving the request (e.g., from device 902C) to send the second version of the content to device 902C, device 902B may send (974) the second version of the content to device 902C, which may allow for more efficient use of network bandwidth than had device 902C received the second version of the content from server 900 or source 904.

Referring now to FIG. 8, a method or process 800 for content caching in accordance with various implementations of the present disclosure is shown. It should be noted that while the operations of FIG. 8 are designated by reference numerals in numeric order, the operations are not required to be performed in the numeric order shown and may be performed in any order as may be practicable in various implementations. Further, some operations shown in FIG. 8 may not be performed at all in various implementations.

In some implementations, process 800 may run on or may be implemented via a server such as server 204(1) as shown in FIG. 2, which may be a cache server as described above. The server running process 800 may be in communication with one or more client devices (e.g., clients 202(1)-202(*n*) as shown in FIG. 2) and a source (e.g., a CDN) via a network or the Internet.

A computing system (e.g., server 204(1) of FIG. 2) may receive (802) a request from a first client device (e.g., client 202(1) of FIG. 2) to download an application. Server 204(1) may determine (804) that the application is not already present on server 204(1) or not otherwise available locally on server 204(1). Determining that the application is not already present on server 204(1) may be based on metadata describing the application.

Further, server 204(1) may request (806) the application from an external content source (e.g., a CDN) based on the application not being present on server 204(1). Also, server 204(1) may receive (808) the application from the external content source and may send (810) the application to client 202(1). Additionally, server 204(1) may store (812), the application so that the application is subsequently available to be downloaded from server 204(1) by another client device (e.g., client 202(*n*)). This may allow for more efficient use of network bandwidth by allowing less reliance on a CDN for content, and may also allow for seeding of content on the cache server with less administrator or content server involvement.

G. Example Implementations of Methods, Systems, and Computer-Readable Media in Accordance with the Present Disclosure The following paragraphs (M1) through (M14) describe examples of methods that may be implemented in accordance with the present disclosure.

(M1) A method may be performed that involves receiving, by a first computing system, a first request from a first client device to download content; receiving, by the first computing system from a second computing system, first information, the first information indicative of a first version of the content that the first client device is authorized to download and a source from which the first version of the content can be downloaded; determining, by the first computing system and based at least in part on the first information, that the first version of the content is already present on the first computing system; and sending, from the first computing system to the first client device, the first version of the content or second information, the second information indicative of the first version of the content.

(M2) A method may be performed as described in paragraph (M1), and may further involve prior to receiving the first request from the first client device to download the content: receiving, by the first computing system, a second request from a second client device to download the content; receiving, by the first computing system from the second computing system, third information, the third information indicating that the second client device is authorized to download the first version of the content and the source from which the first version of the content can be downloaded; determining, by the first computing system and based at least in part on the third information, that the first version of the content is not already present on the first computing system; requesting, based at least in part on the first version of the content not being present on the first computing system, the first version of the content from the source indicated by the third information; receiving, by the first computing system, the first version of the content from the source; and storing, by the first computing system, the first version of the content.

(M3) A method may be performed as described in paragraph (M1) or paragraph (M2), and may further involve sending, from the first computing system to the second computing system, a request for the first information.

(M4) A method may be performed as described in any of paragraphs (M1) through (M3), wherein determining that the first version of the content is already present on the first computing system may comprise comparing a first hash from the first information with a second hash that is mapped to local content stored by the first computing system.

(M5) A method may be performed as described in paragraph (M2) or paragraph (M3), wherein determining that the first version of the content is not already present on the first computing system may comprise determining that a first hash from the first information does not match a second hash that is mapped to local content stored by the first computing system.

(M6) A method may be performed as described in any of paragraphs (M1) through (M5) and may further involve generating, by the first computing system, a hash that is mapped to the first version of the content; and storing the hash by the first computing system.

(M7) A method may be performed as described in any of paragraphs (M1) through (M6), and may further involve receiving, by the first computing system, a second request from a second client device to download the content; and receiving, by the first computing system from the second computing system, third information, the third information indicating that the second client device is authorized to download a second version of the content and the source from which the second version of the content can be downloaded.

(M8) A method may be performed as described in paragraph (M7) and may further involve determining, by the first computing system, that the second version of the content is already present on the first computing system based at least in part on the third information; and sending the second version of the content from the first computing system to the second client device.

(M9) A method may be performed as described in paragraph (M7), and may further involve causing the second client device to determine that the second version of the content is present on a third client device based at least in part on the third information; and causing the third client device to send the second version of the content to the second client device.

(M10) A method may be performed as described in paragraph (M7) or paragraph (M9), and may further involve determining that the second version of the content is present on a third client device based at least in part on the third information; and sending the second version of the content from the third client device to the second client device.

(M11) A method may be performed as described in any of paragraphs (M1) through (M10), wherein the first computing system may include a cache content server.

(M12) A method may be performed as described in any of paragraphs (M1) through (M11), wherein a content cache service runs on the first computing system.

(M13) A method may involve receiving, by a computing system, a request from a first client device to download an application; determining, by the computing system, that the application is not already present on the computing system; requesting, based at least in part on the application not being present on the computing system, the application from an external content source; receiving, by the computing system, the application from the external content source; sending, by the computing system, the application to the first client device; and storing, by the computing system, the application so that the application is subsequently available to be downloaded from the computing system by another client device.

(M14) A method may be performed as described in paragraph (M13), wherein determining that the application is not already present on the computing system may be based at least in part on metadata describing the application.

The following paragraphs (S1) through (S12) describe examples of systems and devices that may be implemented in accordance with the present disclosure.

(S1) A first system may comprise at least one processor and at least one computer-readable medium encoded with instructions which, when executed by the at least one processor, cause the first system to receive a first request from a first client device to download content; receive from a second system, first information, the first information indicative of a first version of the content that the first client device is authorized to download and a source from which the first version of the content can be downloaded; determine, based at least in part on the first information, that the first version of the content is already present on the first system; and send, to the first client device, the first version of the content or second information, the second information indicative of the first version of the content.

(S2) A first system may be configured as described in paragraph (S1), wherein the at least one computer-readable medium may be encoded with additional instructions which, when executed by the at least one processor, further cause the first system to, prior to receiving the first request from the first client device to download the content: receive a second request from a second client device to download the content; receive, from the second system, third information, the third information indicating that the second client device is authorized to download the first version of the content and the source from which the first version of the content can be downloaded; determine, based at least in part on the third information, that the first version of the content is not already present on the first system; request, based at least in part on the first version of the content not being present on the first system, the first version of the content from the source indicated by the third information; receive the first version of the content from the source; and store the first version of the content.

(S3) A first system may be configured as described in paragraph (S1) or paragraph (S2), wherein the at least one computer-readable medium may be encoded with additional instructions which, when executed by the at least one processor, further cause the first system to send, to the second computing system, a request for the first information.

(S4) A first system may be configured as described in any of paragraphs (S1) through (S3), wherein determining that the first version of the content is already present on the first system may comprise comparing a first hash from the first information with a second hash that is mapped to local content stored by the first system.

(S5) A first system may be configured as described in paragraph (S2) or paragraph (S3), wherein determining that the first version of the content is not already present on the first system may comprise determining that a first hash from the first information does not match a second hash that is mapped to local content stored by the first system.

(S6) A first system may be configured as described in any of paragraphs (S1) through (S5), wherein the at least one computer-readable medium may be encoded with additional instructions which, when executed by the at least one processor, further cause the first system to generate a hash that is mapped to the first version of the content; and store the hash.

(S7) A first system may be configured as described in any of paragraphs (S1) through (S6), wherein the at least one computer-readable medium may be encoded with additional instructions which, when executed by the at least one processor, further cause the first system to receive a second request from a second client device to download the content; and receive, from the second system, third information, the third information indicating that the second client device is authorized to download a second version of the content and the source from which the second version of the content can be downloaded.

(S8) A first system may be configured as described in paragraph (S7), wherein the at least one computer-readable medium may be encoded with additional instructions which, when executed by the at least one processor, further cause the first system to determine that the second version of the content is already present on the first system based at least in part on the third information; and send the second version of the content to the second client device.

(S9) A first system may be configured as described in any of paragraphs (S1) through (S8), wherein the first system may include a cache content server.

(S10) A first system may be configured as described in any of paragraphs (S1) through (S9), wherein a content cache service may run on the first system.

(S11) A system may comprise at least one processor and at least one computer-readable medium encoded with instructions which, when executed by the at least one processor, cause the system to receive a request from a first client device to download an application; determine that the application is not already present on the system; request, based at least in part on the application not being present on the system, the application from an external content source; receive the application from the external content source; send the application to the first client device; and store the application so that the application is subsequently available to be downloaded by another client device.

(S12) A system may be configured as described in paragraph (S13), wherein determining that the application is not already present on the system may be based at least in part on metadata describing the application.

The following paragraphs (CRM1) through (CRM12) describe examples of computer-readable media that may be implemented in accordance with the present disclosure.

(CRM1) At least one non-transitory, computer-readable medium may be encoded with instructions which, when executed by at least one processor included in a first computing system, cause the first computing system to receive a first request from a first client device to download content; receive from a second computing system, first information, the first information indicative of a first version of the content that the first client device is authorized to download and a source from which the first version of the content can be downloaded; determine, based at least in part on the first information, that the first version of the content is already present on the first system; and send, to the first client device, the first version of the content or second information, the second information indicative of the first version of the content.

(CRM2) At least one non-transitory, computer-readable medium may be configured as described in paragraph (CRM1), and may be encoded with additional instructions which, when executed by the at least one processor, further cause the first computing system to, prior to receiving the first request from the first client device to download the content: receive a second request from a second client device to download the content; receive, from the second computing system, third information, the third information indicating that the second client device is authorized to download the first version of the content and the source from which the first version of the content can be downloaded; determine, based at least in part on the third information, that the first version of the content is not already present on the first system; request, based at least in part on the first version of the content not being present on the first system, the first version of the content from the source indicated by the third information; receive the first version of the content from the source; and store the first version of the content.

(CRM3) At least one non-transitory, computer-readable medium may be configured as described in paragraph (CRM1) or paragraph (CRM2), and may be encoded with additional instructions which, when executed by the at least one processor, further cause the first computing system to send, to the second computing system, a request for the first information.

(CRM4) At least one non-transitory, computer-readable medium may be configured as described in any of paragraphs (CRM1) through (CRM3), wherein determining that the first version of the content is already present on the first computing system may comprise comparing a first hash from the first information with a second hash that is mapped to local content stored by the first computing system.

(CRM5) At least one non-transitory, computer-readable medium may be configured as described in paragraph (CRM2) or paragraph (CRM3), wherein determining that the first version of the content is not already present on the first computing system may comprise determining that a first hash from the first information does not match a second hash that is mapped to local content stored by the first system.

(CRM6) At least one non-transitory, computer-readable medium may be configured as described in any of paragraphs (CRM1) through CRM(5) and may be encoded with additional instructions which, when executed by the at least one processor, further cause the first computing system to generate a hash that is mapped to the first version of the content; and store the hash.

(CRM7) At least one non-transitory, computer-readable medium may be configured as described in any of paragraphs (CRM1) through (CRM6), and may be encoded with additional instructions which, when executed by the at least one processor, further cause the first computing system to receive a second request from a second client device to download the content; and receive, from the computing second system, third information, the third information indicating that the second client device is authorized to download a second version of the content and the source from which the second version of the content can be downloaded.

(CRM8) At least one non-transitory, computer-readable medium may be configured as described in paragraph (CRM7), and may be encoded with additional instructions which, when executed by the at least one processor, further cause the first computing system to determine that the second version of the content is already present on the first computing system based at least in part on the third information; and send the second version of the content to the second client device.

(CRM9) At least one non-transitory, computer-readable medium may be configured as described in any of paragraphs (CRM1) through CRM8), wherein the first computing system may include a cache content server.

(CRM10) At least one non-transitory, computer-readable medium may be configured as described in any of paragraphs (CRM1) through (CRM9), wherein a content cache service may run on the first system.

(CRM11) At least one non-transitory, computer-readable medium may be encoded with instructions which, when executed by at least one processor included in a first computing system, cause the first computing system to receive a request from a first client device to download an application; determine that the application is not already present on the first computing system; request, based at least in part on the application not being present on the first computing system, the application from an external content source; receive the application from the external content source; send the application to the first client device; and store the application so that the application is subsequently available to be downloaded by another client device.

(CRM12) At least one non-transitory, computer-readable medium may be configured as described in paragraph (CRM13), wherein determining that the application is not already present on the first computing system may be based at least in part on metadata describing the application.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   receiving, by a first computing system, a first request from a first client device to download content;
   sending, from the first computing system to a second computing system, a second request for first information indicating whether the first client device is authorized to download the content, the second request including a first identifier of the first client device;
   receiving, by the first computing system and from the second computing system, the first information, the first information indicating that the first client device is authorized to download a first version of the content and identifying a source from which the first version of the content can be downloaded, the first information having been determined by the second computing system using the first identifier included in the second request;
   determining, by the first computing system and based at least in part on the first information, that the first version of the content is already present on the first computing system; and
   sending, from the first computing system to the first client device, the first version of the content or second information, the second information indicative of the first version of the content.

2. The method of claim 1, further comprising:
   prior to receiving the first request from the first client device to download the content:
      receiving, by the first computing system, a third request from a second client device to download the content;
      sending, from the first computing system to the second computing system, a fourth request for third information indicating whether the second client device is authorized to download the content, the fourth request including a second identifier of the second client device;
      receiving, by the first computing system and from the second computing system, the third information, the third information indicating that the second client device is authorized to download the first version of the content and identifying the source from which the first version of the content can be downloaded, the third information having been determined by the second computing system using the second identifier included in the fourth request;
      determining, by the first computing system and based at least in part on the third information, that the first version of the content is not already present on the first computing system;
      requesting, based at least in part on the first version of the content not being present on the first computing system, the first version of the content from the source indicated by the third information;
      receiving, by the first computing system, the first version of the content from the source; and
      storing, by the first computing system, the first version of the content.

3. The method of claim 1, wherein determining that the first version of the content is already present on the first computing system comprises comparing a first hash from the first information with a second hash that is mapped to local content stored by the first computing system.

4. The method of claim 2, wherein determining that the first version of the content is not already present on the first computing system comprises determining that a first hash from the first information does not match a second hash that is mapped to local content stored by the first computing system.

5. The method of claim 2, further comprising:
   generating, by the first computing system, a hash that is mapped to the first version of the content; and
   storing the hash by the first computing system.

6. The method of claim 1, further comprising:
   receiving, by the first computing system, a third request from a second client device to download the content;
   sending, from the first computing system to the second computing system, a fourth request for third information indicating whether the second client device is authorized to download the content, the fourth request including a second identifier of the second client device; and
   receiving, by the first computing system and from the second computing system, the third information, the third information indicating that the second client device is authorized to download a second version of the content and identifying the source from which the second version of the content can be downloaded, the third information having been determined by the second computing system using the second identifier included in the fourth request.

7. The method of claim 6, further comprising:
   determining, by the first computing system, that the second version of the content is already present on the first computing system based at least in part on the third information; and
   sending the second version of the content from the first computing system to the second client device.

8. The method of claim 6, further comprising:
   causing the second client device to determine that the second version of the content is present on a third client device based at least in part on the third information; and
   causing the third client device to send the second version of the content to the second client device.

9. The method of claim 6, further comprising:
   determining that the second version of the content is present on a third client device based at least in part on the third information; and
   sending the second version of the content from the third client device to the second client device.

10. The method of claim 1, wherein the first computing system includes a cache content server.

11. The method of claim 1, wherein a content cache service runs on the first computing system.

12. A first system, comprising:
   at least one processor; and
   at least one computer-readable medium encoded with instructions which, when executed by the at least one processor, cause the first system to:
   receive a first request from a first client device to download content;

send, to a second system, a second request for first information indicating whether the first client device is authorized to download the content, the second request including a first identifier of the first client device;

receive from the second system, the first information, the first information indicating that the first client device is authorized to download a first version of the content and identifying a source from which the first version of the content can be downloaded, the first information having been determined by the second system using the first identifier included in the second request;

determine, based at least in part on the first information, that the first version of the content is already present on the first system; and send, to the first client device, the first version of the content or second information, the second information indicative of the first version of the content.

13. The first system of claim 12, wherein the at least one computer-readable medium is further encoded with additional instructions which, when executed by the at least one processor, further cause the first system to:

prior to receiving the first request from the first client device to download the content:

receive a third request from a second client device to download the content;

send, to the second system, a fourth request for third information indicating whether the second client device is authorized to download the content, the fourth request including a second identifier of the second client device;

receive, from the second system, the third information, the third information indicating that the second client device is authorized to download the first version of the content and identifying the source from which the first version of the content can be downloaded, the third information having been determined by the second system using the second identifier included in the fourth request;

determine, based at least in part on the third information, that the first version of the content is not already present on the first system;

request, based at least in part on the first version of the content not being present on the first system, the first version of the content from the source indicated by the third information;

receive the first version of the content from the source; and store the first version of the content.

14. The first system of claim 12, wherein the at least one computer-readable medium is further encoded with additional instructions which, when executed by the at least one processor, further cause the first system to:

receive a third request from a second client device to download the content;

send, to the second system, a fourth request for third information indicating whether the second client device is authorized to download the content, the fourth request including a second identifier of the second client device; and receive, from the second system, the third information, the third information indicating that the second client device is authorized to download a second version of the content and identifying the source from which the second version of the content can be downloaded, the third information having been determined by the second system using the second identifier included in the fourth request.

15. The first system of claim 12, wherein the first system includes a cache content server.

16. The first system of claim 12, wherein a content cache service runs on the first system.

17. A method comprising:

receiving, by a computing system, a request from a first client device to download an application;

determining, by the computing system, that the application is not already present on the computing system;

requesting, based at least in part on the application not being present on the computing system, the application from an external content source;

receiving, by the computing system, the application from the external content source;

sending, by the computing system, the application to the first client device; and storing, by the computing system, the application so that the application is subsequently available to be downloaded from the computing system by another client device.

18. The method of claim 17, wherein determining that the application is not already present on the computing system is based at least in part on metadata describing the application.

19. The method of claim 1, wherein:

the second request for first information includes a certificate associated with the first client device; and the first information is determined by the second computing system in response to validating the certificate.

20. The first system of claim 12, wherein:

the first request for first information includes a certificate associated with the first client device; and the first information is determined by the second system in response to validating the certificate.

* * * * *